United States Patent
Ko et al.

(10) Patent No.: US 12,441,979 B2
(45) Date of Patent: Oct. 14, 2025

(54) AKKERMANSIA MUCINIPHILA STRAIN AND USE THEREOF

(71) Applicant: KoBioLabs, Inc., Seoul (KR)

(72) Inventors: Gwang Pyo Ko, Seoul (KR); Hyo Shin Yoon, Gangneung-si (KR); Chung Hwan Cho, Gwangmyeong-si (KR); Hyun Ju You, Incheon (KR); Tae Wook Nam, Seongnam-si (KR)

(73) Assignee: KOBIOLABS, INC., Seoul (KR)

( * ) Notice: Subject to any disclaimer, the term of this patent is extended or adjusted under 35 U.S.C. 154(b) by 317 days.

(21) Appl. No.: 17/279,247

(22) PCT Filed: Oct. 11, 2019

(86) PCT No.: PCT/KR2019/013402
§ 371 (c)(1),
(2) Date: Mar. 24, 2021

(87) PCT Pub. No.: WO2020/076136
PCT Pub. Date: Apr. 16, 2020

(65) Prior Publication Data
US 2022/0002665 A1    Jan. 6, 2022

(30) Foreign Application Priority Data

Oct. 11, 2018   (KR) .................. 10-2018-0121137
Oct. 10, 2019   (KR) .................. 10-2019-0125670

(51) Int. Cl.
*A61K 38/16*   (2006.01)
*A23L 33/00*   (2016.01)
(Continued)

(52) U.S. Cl.
CPC ............ *C12N 1/205* (2021.05); *A23L 33/135* (2016.08); *A23L 33/40* (2016.08); *A61K 35/74* (2013.01);
(Continued)

(58) Field of Classification Search
CPC ....... C12N 1/205; A23L 33/135; A23L 33/40; A61K 35/74; A61K 38/482; A61P 3/04;
(Continued)

(56) References Cited

U.S. PATENT DOCUMENTS

| | | |
|---|---|---|
| 2018/0250347 A1 | 9/2018 | Cani et al. |
| 2020/0030388 A1 | 1/2020 | Majeed |
| 2022/0002665 A1 | 1/2022 | Ko et al. |

FOREIGN PATENT DOCUMENTS

| | | |
|---|---|---|
| CN | 104918626 | 9/2015 |
| CN | 106176800 | 12/2016 |

(Continued)

OTHER PUBLICATIONS

Appendix A—sequence alignment SEQ ID No. 2 and B2UM07 (Year: 2023).*

(Continued)

*Primary Examiner* — Louise W Humphrey
*Assistant Examiner* — Mary A Crum
(74) *Attorney, Agent, or Firm* — LEX IP MEISTER, PLLC

(57) ABSTRACT

The present invention relates to *Akkermansia muciniphila* SNUG-61027 strain (accession number KCTC 13530BP) and use thereof, specifically, a composition for suppressing appetite or preventing, ameliorating, alleviating or treating metabolic diseases, comprising the strain, or a culture solution thereof, etc. or a B2UM07 protein isolated therefrom as an active ingredient, and use thereof for suppressing appetite or preventing, ameliorating, alleviating or treating metabolic diseases, and a method of suppressing appetite or preventing, ameliorating, alleviating or treating metabolic diseases using the same are provided. Through this, among the anti-obesity effects, not only weight reduction and glucose homeostasis regulation, but also the effect on brown fat and (Continued)

the effect of secreting appetite regulating hormones are exhibited.

3 Claims, 28 Drawing Sheets

Specification includes a Sequence Listing.

(51) Int. Cl.
```
     A23L 33/135      (2016.01)
     A61K 35/74       (2015.01)
     A61K 38/48       (2006.01)
     A61P 3/04        (2006.01)
     A61P 3/08        (2006.01)
     C12N 1/20        (2006.01)
     C12R 1/01        (2006.01)
```
(52) U.S. Cl.
CPC ............ *A61K 38/482* (2013.01); *A61P 3/04* (2018.01); *A61P 3/08* (2018.01); *C12Y 304/21102* (2013.01); *A23V 2002/00* (2013.01); *C12R 2001/01* (2021.05)

(58) Field of Classification Search
CPC ............... A61P 3/08; C12Y 304/21102; A23V 2002/00; C12R 2001/01
See application file for complete search history.

(56) References Cited

FOREIGN PATENT DOCUMENTS

| | | |
|---|---|---|
| CN | 107849093 | 3/2018 |
| CN | 108289918 | 7/2018 |
| EP | 2919796 | 9/2015 |
| KR | 10-2015-0093711 | 8/2015 |
| KR | 10-2015-0133646 | 11/2015 |
| KR | 10-1809172 | 12/2017 |
| WO | 2014075745 | 5/2014 |
| WO | 2015-178653 | 11/2015 |
| WO | 2016-177797 | 11/2016 |
| WO | 2017-060698 | 4/2017 |

OTHER PUBLICATIONS

B2UM07, Uniprot B2UM07 B2UM07_AKKM8, Carboxyl-terminal protease, Feb. 2018 (Year: 2018).*
AY271254.1, GenBank AY271254.1 Akkermansia muciniphila strain Muc 16S ribosomal RNA gene, complete sequence, 2004 (Year: 2004).*
Appendix A, Alignment of AY271254.1 and SEQ ID No. 1 (Year: 2023).*
Appendix B, Alignment of Uniprot B2UM07 and SEQ ID No. 2, 2023. (Year: 2023).*
Jian, Huafeng, et al. "Akkermansia muciniphila as a next-generation probiotic in modulating human metabolic homeostasis and disease progression: a role mediated by gut-liver-brain axes?." International Journal of Molecular Sciences 24.4 (2023): 3900 (Year: 2023).*
Pellegrino, A., et al. Role of Akkermansia in human diseases: from causation to therapeutic properties. Nutrients. 2023; 15: 1815 (Year: 2023).*
EPO, Search Report of EP 19871795.1 dated Jul. 14, 2022.
KIPO, PCT Search Report & Written Opinion of PCT/KR2019/013402 dated Sep. 18, 2020.
Muriel Derrien et al., "Akkermansia muciniphila and its role in regulating host functions", Microbial Pathogenesis 106 (2017) 171-181, Feb. 11, 2016. http://dx.doi.org/10.1016/j.micpath.2016.02.005.
Patrice D. Cani et al., "Next-Generation Beneficial Microbes: The Case of Akkermansia muciniphila", Front. Microbiol., vol. 8, Article 1765, Sep. 22, 2017. doi: 10.3389/fmicb.2017.01765.
Hubert Plovier et al., "A purified membrane protein from Akkermansia muciniphila or the pasteurized bacterium improves metabolism in obese and diabetic mice", Nat Med 23, 107-113 (2017), Nov. 28, 2016. https://doi.org/10.1038/nm.4236.
Isidro Salcedo et al., "Neuroprotective and neurotrophic actions of glucagon-like peptide-1: an emerging opportunity to treat neurodegenerative and cerebrovascular disorders", British Journal of Pharmacology (2012), vol. 166, issue. 5, 1586-1599, Apr. 20, 2012. DOI:10.1111/j.1476-5381.2012.01971.x.
Mathias Burgmaler et al., "Glucagon-like peptide-1 (GLP-1) and its split products GLP-1(9-37) and GLP-1(28-37) stabilize atherosclerotic lesions in apoe −/− mice", Atherosclerosis, vol. 231, Issue 2, p. 427-435, Dec. 1, 2013. http://dx.doi.org/10.1016/j.atherosclerosis.2013.08.033.
George G. Sokos et al., "Glucagon-Like Peptide-1 Infusion Improves Left Ventricular Ejection Fraction and Functional Status in Patients With Chronic Heart Failure", Journal of Cardiac Failure, vol. 12, No. 9, 2006. doi:10.1016/j.cardfail.2006.08.211.
Kiwon Ban et al., "Cardioprotective and Vasodilatory Actions of Glucagon-Like Peptide 1 Receptor Are Mediated Through Both Glucagon-Like Peptide 1 Receptor-Dependent and -Independent Pathways", Circulation. May 6, 2008;117(18):2340-50. DOI: 10.1161/CIRCULATIONAHA.107.739938.
Frank Reimann et al., "Glucose Sensing in L Cells: A Primary Cell Study", Cell Metabolism 8, 532-539, Dec. 3, 2008 doi: 10.1016/j.cmet.2008.11.002.
Lina M. Lauffer et al., "GPR119 Is Essential for Oleoylethanolamide-Induced Glucagon-Like Peptide-1 Secretion From the Intestinal Enteroendocrine L-Cell", Diabetes, vol. 58, May 2009.
Hyeung-Jin Jang et al., "Gut-expressed gustducin and taste receptors regulate secretion of glucagon-like peptide-1", PNAS, Sep. 18, 2007, 104 (38) 15069-15074; https://doi.org/10.1073/pnas.0706890104.
T Lieu et al., "GPBA: a GPCR for bile acids and an emerging therapeutic target for disorders of digestion and sensation", Br J Pharmacol., Mar. 2014;171(5):1156-66. doi: 10.1111/bph.12426.
Thijs W.H. Pols et al., "TGR5 Activation Inhibits Atherosclerosis by Reducing Macrophage Inflammation and Lipid Loading", Cell Metabolism, 14, 747-757, Dec. 7, 2011. DOI 10.1016/j.cmet.2011.11.006.
Hubert Plovier et al., "A purified membrane protein from Akkermansia muciniphila or the pasteurized bacterium improves metabolism in obese and diabetic mice", Nat Med. Jan. 2017;23(1):107-113. doi: 10.1038/nm.4236. Epub Nov. 28, 2016.
Maria Carlota Dao et al., "Akkermansia muciniphila and improved metabolic health during a dietary intervention in obesity: relationship with gut microbiome richness and ecology", Gut 2016;65:426-436, Jun. 22, 2015.
N. I. Ursova, "Metabolic Syndrome and Metabolism-Associated Diseases of the Digestive System", Medical Council. 2017;(19):112-119. https://doi.org/10.21518/2079-701X-2017-19-112-119.
Rospatent, Office Action of RU 2021112440 dated Sep. 30, 2021.
Zhao, Shaoqian, et al. "Akkermansia muciniphila improves metabolic profiles by reducing inflammation in chow diet-fed mice." Journal of molecular endocrinology 58.1 (Jan. 2017, Epub Nov. 7, 2016): 1-14.
Shen Nan, et al. "Research progress of Akkermansia muciniphila and its mechanism in obesity." Basic and Clinical Medicine 38.10 (Oct. 2018). pp. 1475-1479.
GenBank: ACD05451.1: carboxyl-terminal protease [Akkermansia muciniphila ATCC BAA-835] (Dec. 11, 2013).
"SubName: Full=Carboxyl-terminal protease {EC0:0000-3131EMBL:ACD05451.1}; EC=3. 4. 21.102 {EC0:0000-3131EMBL:ACD05451.1};", XP55936254, retrieved from EBI accession No. UNIPROT:B2UM07, Database accession No. B2UM07, Jul. 2008.
Mark W. J. Van Passel et al., "The Genome of Akkermansia muciniphila, a Dedicated Intestinal Mucin Degrader, and Its Use in Exploring Intestinal Metagenomes", PloS one 6.3 (2011): e16876., Mar. 3, 2011.

* cited by examiner

FIG. 10A

| ID# | Gene ID# | Protein ID | Protein | Molecular weight(kDa) |
|---|---|---|---|---|
| P1 | Amuc_1418 | B2UKW8 | Phosphoglycerate kinase | 42.692 |
| P2 | Amuc_0017 | B2UL75 | Glycosyl hydrolase family 109 protein | 53.802 |
| P3 | Amuc_1832 | B2UN39 | L-fucose isomerase | 64.695 |
| P4 | Amuc_0405 | B2UND1 | Outer membrane chaperone Skp (OmpH) | 23.491 |
| P5 | Amuc_1282 | B2URM2 | Peptidyl-prolyl cis-trans isomerase | 30.114 |
| P6 | Amuc_0038 | B2UL96 | Glutaminase | 33.127 |
| P7 | Amuc_1829 | B2UN36 | Class II aldolase/adducin family protein | 29.808 |
| P8 | Amuc_0576 | B2UPD6 | Peptidase M16 domain protein | 160.48 |
| P9 | Amuc_1631 | B2UM07 | Carboxyl-terminal protease | 83.86 |

FIG. 10B

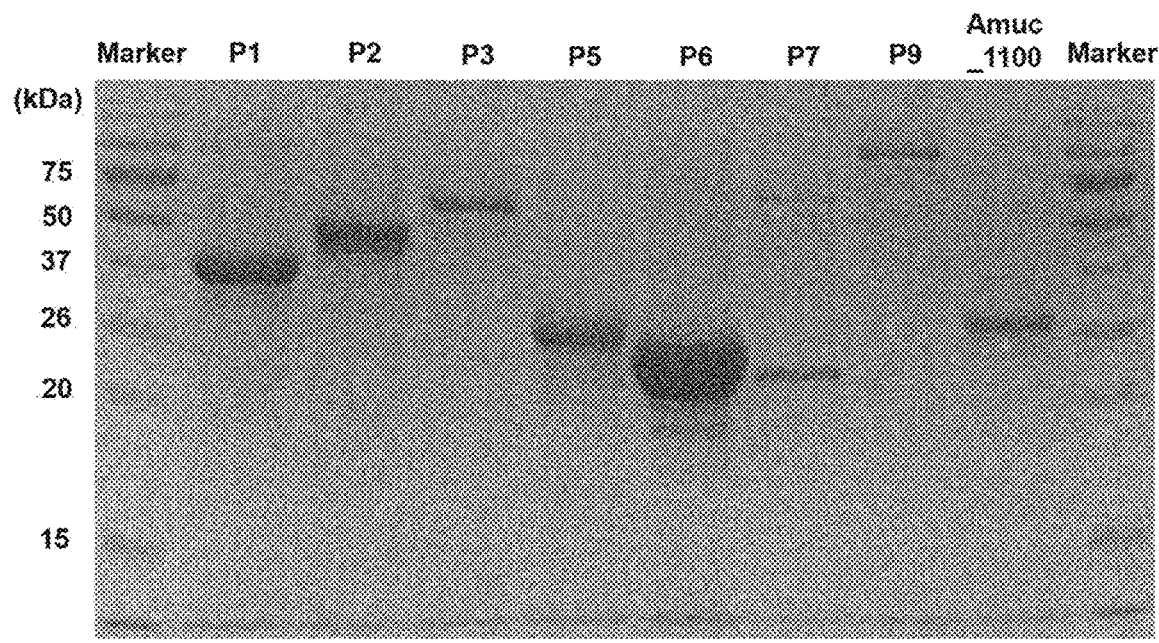

SEQUENCE LISTING

<160> NUMBER OF SEQ ID NOS: 2

<210> SEQ ID NO 1
<211> LENGTH: 918
<212> TYPE: DNA
<213> ORGANISM: Unknown
<220> FEATURE:
<223> OTHER INFORMATION: Akkermansia muciniphila SNUG-61027

<400> SEQUENCE: 1

```
gctaataatt ctctagtggc gcacgggtga gtaacacgtg agtaacctgc ccccgagagc    60
gggatagccc tgggaaactg ggattaatac cgcatagtat cgaaagatta aagcagcaat   120
gcgcttgggg atgggctcgc ggcctattag ttagttggtg aggtaacggc tcaccaaggc   180
gatgacgggt agccggtctg agaggatgtc cggccacact ggaactgaga cacggtccag   240
acacctacgg gtggcagcag tcgagaatca ttcacaatgg gggaaaccct gatggtgcga   300
cgccccgtgg gggaatgaag gtcttcggat tgtaaacccc tgtcatgtgg agcaaatta    360
aaaagatagt accacaagag gaagagacgg ctaactctgt gccagcagcc gcggtaatac   420
agaggtctca gcgttgttc ggaatcactg gcgtaaagc gtgcgtaggc tgtttcgtaa    480
gtcgtgtgtg aaaggcgcgg gctcaacccg cggacggcac atgatactgc gagactagag   540
taatggaggg ggaaccggaa ttctcggtgt agcagtgaaa tgcgtagata tcgagaggaa   600
cactcgtggc gaaagcgggt tcctggacat taactgacgc ttaggcacga aggccagggg   660
agcgaaaggg attagatacc cctgtagtcc tggcagtaaa cggtcacgc ttggtgtgcg    720
gggaatcgac cccctgcgtg ccggaactaa cgcgttaagc gtgccgcccg ggggagtacg   780
gtcgcaagat taaaactcaa agaaattgac ggggacccgc acaagcggtg gaattatgtg   840
gcttaattcg atgcaacgcg aagaacctta cctgggcttg acatgtaatg aacaacatgt   900
gaaagcatgc gactcttc                                                 918
```

<210> SEQ ID NO 2
<211> LENGTH: 748
<212> TYPE: PRT
<213> ORGANISM: Unknown
<220> FEATURE:
<223> OTHER INFORMATION: Akkermansia muciniphila B2UM07
      Cytoplasmic_Membrane (Amuc_1631)

<400> SEQUENCE: 2

Met Glu Lys Asn Ala Pro Phe Ser Val Met Asn Met His Ser Phe Arg
1               5                   10                  15

Trp Ile Arg Leu Thr Ala Phe Ser Ala Leu Ala Ala Ala Ile Thr
            20                  25                  30

Ser Cys Ala Ser Ala Ala Thr Asp Phe Asn Gln Val Gly Lys Gln Met
        35                  40                  45

Ser Leu Leu Leu Gln Asn Phe His Phe Ser Arg Lys Glu Phe Ser Asp
    50                  55                  60

Glu Leu Ser Thr Lys Phe Leu Glu Thr Tyr Leu Arg Lys Val Asp Pro
65                  70                  75                  80

Asn Lys Ile Phe Phe Thr Gln Gln Asp Val Asp Ala Leu Lys Arg Lys
                85                  90                  95

Tyr Gly Lys Glu Leu Asp Asp Tyr Leu Met Ser Gly Gln Met Met Asp
            100                 105                 110

Ala Ala Gln Ala Met His Ala Leu Tyr Arg Gln Arg Ala Met Gln Arg
        115                 120                 125

```
Ile Ser Tyr Ala Arg Asp Leu Leu Lys Lys Gly Gly Phe Thr Phe Asp
    130                 135                 140
Lys Asp Lys Ser Ile Glu Arg Ser Arg Lys Thr Ala Ala Trp Pro
145                 150                 155                 160
Lys Asp Glu Ala Glu Met Gln Gln Val Trp Lys Asp Met Val Glu Glu
                165                 170                 175
Gln Leu Leu Ser Glu Ile Leu Arg Arg Glu Thr Val Ala Arg Leu Ala
            180                 185                 190
Lys Glu Gln Asn Lys Pro Asp Pro Leu Ala Asn Glu Lys Pro Ala Glu
        195                 200                 205
Glu Lys Leu Leu Met Arg Tyr Glu Arg Ile Gln Arg Asn Ile Gln Glu
    210                 215                 220
Thr Asp Leu Glu Asp Val Ala Glu Thr Leu Leu Ser Ala Val Ala Leu
225                 230                 235                 240
Thr Tyr Asp Pro His Thr Asp Tyr Met Gly Ala Arg Gln Val Asp Arg
                245                 250                 255
Phe Lys Ile Ser Met Gly Thr Glu Leu Thr Gly Ile Gly Ala Leu Leu
            260                 265                 270
Gly Ser Glu Asp Asp Gly Ser Thr Lys Ile Thr Gly Ile Val Val Gly
        275                 280                 285
Gly Pro Ala Asp Lys Ser Gly Glu Leu Lys Leu Asn Asp Arg Ile Val
    290                 295                 300
Ala Ile Asp Ser Asp Asn Ser Gly Glu Met Val Asp Ile Leu Phe Met
305                 310                 315                 320
Lys Leu Asp Lys Val Val Asp Met Ile Arg Gly Ala Glu Asn Thr Gln
                325                 330                 335
Met Arg Leu Lys Val Glu Pro Ala Asp Ala Pro Gly Gln Ala Lys Ile
            340                 345                 350
Ile Thr Leu Thr Arg Ser Lys Val Pro Leu Lys Asp Glu Leu Ala Lys
        355                 360                 365
Gly Glu Ile Ile Glu Leu Thr Gly Ala Pro Glu Gly Arg Asn Arg Ile
    370                 375                 380
Gly Val Leu Ser Leu Pro Ser Phe Tyr Ala Asp Met Glu Gly Gly Asp
385                 390                 395                 400
Arg Arg Cys Ala Lys Asp Val Lys Lys Ile Leu Glu Arg Met Asn Lys
                405                 410                 415
Glu Asn Val Asp Gly Leu Val Ile Asp Leu Arg Ser Asn Gly Gly Gly
            420                 425                 430
Ser Leu Glu Glu Val Arg Leu Met Thr Gly Phe Phe Thr Gly Asn Gly
        435                 440                 445
Pro Val Val Gln Ile Lys Asp Thr Arg Gly Asn Val Asp Ile Lys Ser
    450                 455                 460
Ala His Asn Arg Gln Lys Leu Phe Asn Gly Pro Ile Val Val Leu Ile
465                 470                 475                 480
Asn Lys Leu Ser Ala Ser Ala Ser Glu Ile Leu Ala Ala Ala Leu Gln
                485                 490                 495
Asp Tyr Gly Arg Ala Val Ile Val Gly Asp Glu Ser Thr Phe Gly Lys
            500                 505                 510
Gly Ser Val Gln Gln Pro Val Asp Ile Gly Gln Tyr Leu Pro Phe Phe
        515                 520                 525
Ala Ala Arg Asp Arg Ala Gly Leu Leu Lys Val Thr Thr Gln Lys Phe
    530                 535                 540
Tyr Arg Val Ala Gly Gly Ser Thr Gln Leu Lys Gly Val Glu Ser Asp
```

```
545                 550                 555                 560
Ile Gln Leu Pro Thr Ala Thr Ala Ala Phe Glu Leu Gly Glu Asp Ile
                565                 570                 575

Leu Asp Tyr Ala Met Pro Tyr Asp Gln Ile Thr Pro Cys Thr Asn Tyr
                580                 585                 590

Lys Lys Asp Ser Ser Ile Ala Ala Met Leu Pro Val Leu Lys Asp Ala
                595                 600                 605

Ser Ala Lys Arg Val Glu Lys Asp Arg Asp Leu Gln Ile Ala Arg Glu
                610                 615                 620

Asp Ile Ala Met Met Lys Gln Arg Ile Lys Asp Asn Lys Leu Ser Leu
625                 630                 635                 640

Asn Lys Lys Ile Arg Glu Gln Glu Asn Ser Ala Leu Glu Glu Arg Arg
                645                 650                 655

Lys Ser Ile Asn Lys Glu Arg Lys Ile Arg Phe Ala Glu Met Ala Arg
                660                 665                 670

Glu Asp Ala Thr Lys Tyr Lys Ile Tyr Arg Leu Thr Leu Asp Asp Val
                675                 680                 685

Asn Ala Lys Glu Leu Pro Leu Ala Asp Pro Glu Lys Asp Asn Glu Gln
                690                 695                 700

Phe Met His Leu Ala Glu Asp Pro Thr Ala Glu Leu Asp Asp Ser Pro
705                 710                 715                 720

Glu Tyr Pro Ser Gly Leu Asp Pro Glu Leu Arg Glu Gly Ile Asn Ile
                725                 730                 735

Val Gln Asp Met Leu Lys Leu Glu Ser Ser Gly Lys
                740                 745
```

AKKERMANSIA MUCINIPHILA STRAIN AND USE THEREOF

CROSS-REFERENCE TO RELATED APPLICATION(S)

This application claims the benefit of Korean Patent Application No. 10-2018-0121137 filed on Oct. 11, 2018 and Korean Patent Application No. 10-2019-0125670 filed on Oct. 10, 2019 in the Korean Intellectual Property Office, each of which is incorporated herein by reference in its entirety.

TECHNICAL FIELD

Incorporation of Sequence Listing

A sequence listing containing the file named "LPP2021-0526US_sequence_listing.txt" which is 7,645 bytes and created on Mar. 24, 2021 and comprises 2 sequences, is incorporated herein by reference in its entirety.

The present invention relates to *Akkermansia muciniphila* SNUG-61027 strain (accession number KCTC 13530BP) which is effective for suppressing appetite and preventing, ameliorating, alleviating and treating metabolic diseases, and use thereof.

BACKGROUND ART

Obesity is a condition in which excess body fat is accumulated in a human body due to changes in dietary habits such as a high-calorie diet, lack of exercise, etc., is associated with the onset of type 2 diabetes, cardiovascular disease, liver disease, and various cancers, and therefore, is of great clinical importance. On the other hand, intestinal microorganisms are known to have a deep correlation with metabolic diseases such as obesity and diabetes, in particular, it has been found that *Akkermansia muciniphila* strain increases in the intestines of mice treated with antidiabetic drug metformin, and glucose homeostasis is improved when administering this strain to a high fat diet mouse, whereby this strain is attracting attention as a potential anti-obesity drug, and presents a new paradigm for research on anti-obesity agents.

Various studies have been conducted to understand the mechanism of anti-obesity effects of *Akkermansia muciniphila* strain, whose anti-obesity efficacy has been verified among intestinal microorganisms close to 10 times the total number of human cells, however, conventional studies have focused on anti-obesity indicators such as weight reduction, improvement of chronic metabolic inflammation, restoration of damaged barriers, or improvement of blood lipid indicator.

However, the anti-obesity effect has various mechanisms in addition to the above-mentioned indicator, and in particular, it has been recently reported that inducing brown fat interacts with intestinal microorganisms in connection with the mechanism of body temperature maintenance homeostasis. Adipose tissue is divided into white adipose tissue which stores energy in forms of triglycerides, and brown adipose tissue which releases energy as heat, and brown adipose tissue induces energy consumption through tissue-specific UCP-1 factors, and thereby functions to regulate glucose homeostasis and increase insulin sensitivity.

Meanwhile, glucagon-like peptide (GLP-1), an appetite-regulating hormone, is a hormone secreted from ileum by food intake, which increases satiety, regulates appetite, and induces insulin secretion from the pancreas, thereby regulating blood glucose levels.

GLP-1 is secreted from L-cells, which is a type of intestinal endocrine cells present in ileum and colon.

The GLP-1 is known to be associated with the therapeutic effect on diabetes, the therapeutic effect on obesity, the therapeutic effect on heart disease, the therapeutic effect on cerebrovascular disease, and the therapeutic effect on nerve cell inflammation (Salcedo I et al., Neuroprotective and neurotrophic actions on glucagon-like peptide-1 (GLP-1): an emerging opportunity to treat neurodegenerative and cerebrovascular disorders. British Journal of Pharmacology (2012) 166, 1586-1599), the therapeutic effect on atherosclerosis (Burgmaier M et al., Glucagon-like peptide-1 (GLP-1) and its split products GLP-1(9-37) and GLP-1(28-37) stabilize atherosclerotic lesions in apoe−/− mice. Atherosclerosis (2013) 231, 427-435), and the like.

Further, GLP-1 is involved in showing a therapeutic effect on diabetes through the stimulation of glucose-dependent insulin secretion from the pancreas, the enhancement of insulin gene expression, the effect of promoting pancreatic beta cell proliferation, the effect of promoting the survival of pancreatic beta cells, the effect of inhibiting glucagon secretion, the decrease of blood glucose level, and the like, and is involved in showing a therapeutic effects on obesity through slowing the gastric emptying rate, suppressing appetite, enhancing satiety and inhibiting food intake. In addition, GLP-1 shows a therapeutic effect on cardiac diseases through the effect of protecting cardiomyocytes from local ischemia and the effect of strengthening the heart function of patients who are at risk of heart attack (Sokos, G. G. et al., Glucagon-like peptide-1 infusion improves left ventricular ejection fraction and functional status in patients with chronic heart failure. J. Card. Fail. (2006) 12: 694-699., Ban, K., et al., Cardioprotective and vasodilatory actions of glucagon-like peptide-1 receptor are mediated through both glucagon-like peptide-1 receptor-dependent and -independent pathways. Circulation (2008) 117: 2340-2350.).

It has been known that the secretion of GLP-1 is promoted by the activation of TGR5 and GPR119, which are a kind of G protein-coupled receptors (GPCRs) (Reimann, F., et al., Glucose sensing in L cells: a primary cell study. Cell Metab. (2008) 8: 532-539; Lauffer, L. M., et al., GPR119 is essential for oleoylethanolamide-induced glucagon-like peptide-1 secretion from the intestinal enteroendocrine L-cell. Diabetes (2009) 58:1058-1066), or the activation of α-gustducin (Jang, H. J., et al., 2007. Gut expressed gustducin and taste receptors regulate secretion of glucagon-like peptide-1. Proceeding of the National Academy of Science 104, 1506915074.). In particular, it is known that the activation of G protein-coupled receptor (GPCR) TGR5 (GPR131) expressed in brown adipose tissue and muscle increases energy expenditure and thus shows a therapeutic effect on obesity, which is related to the improvement of liver disease (Lieu T et al., GPBA: A G protein-coupled receptor for bile acids and an emerging therapeutic target for disorders of digestion and sensation. British Journal of Pharmacology (2013) in press), and it has been reported to inhibit arteriosclerosis (Pols T W H et al., TGR5 activation inhibits atherosclerosis by reducing macrophage inflammation. Cell Metabolism (2011) 14, 747).

Further, triglycerides accumulated excessively in obese patients are stored not only in adipose tissues, but also in the liver or muscles to induce insulin resistance. Therefore, the consumption of excessively stored triglycerides can be a prophylaxis and treatment of fundamental obesity and metabolic diseases resulting therefrom. Adipocytes are broadly classified into white adipocytes, brown adipocytes and beige adipocytes. White adipocytes are stored in large fat globules of triglycerides, are mainly found in the abdomen, and are known to play a negative role in health. It has been reported that brown adipocytes contain more mitochondria and small-sized fat globules compared to white adipocytes, and may be induced by maintaining body temperature through heat generation and proper exercise. Mice induced to contain a large amount of brown adipocytes were effective for obesity and metabolic diseases by relatively inducing weight reduction and increase of caloric consumption to obesity caused by a high fat diet. Further, brown adipocytes express a large amount of UCP-1 (uncoupling protein-1) protein, which is known to play a decisive role in heat generation by consuming calories rather than storage of calories in adipocytes. In addition to brown adipocytes, beige adipocytes are also recognized as important adipocytes. Beige adipocytes are induced by stimulation such as exercise or cold from white adipocytes, which are harmful to health, and the trait of white adipocytes is reduced, but they become to have the characteristics of brown adipocytes, resulting in the increased expression of UCP-1. These beige adipocytes are also known to be beneficial for obesity and metabolic diseases similar to the brown adipocytes found in mice.

PRIOR ART LITERATURE

1. Korean Patent No. 10-1809172
2. Korean Patent Publication No. 10-2015-0133646

DETAILED DESCRIPTION OF THE INVENTION

Technical Problem

Under these circumstances, in order to effectively prevent and treat metabolic diseases, the present inventors have found that *Akkermansia muciniphila* enhances UCP-1 factor affecting brown fat activity, and induces the secretion of GLP-1 as an appetite-regulating hormone in small intestine, by using a standard strain of *Akkermansia muciniphila* strain (Akk; American Type Culture Collection, accession number ATCC BAA-835) which is currently used in anti-obesity research, and an isolated strain of *Akkermansia muciniphila* SNUG-61027 strain (accession number: KCTC13530) which is isolated from feces of healthy Korean people.

In addition, the present inventors have found that this pathway is induced dependently on IL-6 cytokine of the host, and finally identified *Akkermansia muciniphila* strain which promote the induction of GLP-1 secretion in the anti-obesity mechanism, culture solution, bacterial cell, supernatant, extract or fraction of the strain, or a target protein derived from the strain, thereby completing the invention.

Technical Solution

As an aspect for achieving the object, an embodiment of the present invention provides an *Akkermansia muciniphila* (Akk) SNUG-61027 strain with accession number KCTC 13530BP. Specific information on the strain is as follows.

Name of depositary institution: Korea Research Institute of Bioscience and Biotechnology
Accession number: KCTC 13530BP
Accession date: May 25, 2018

The strain of the present invention comprises 16S rDNA consisting of a nucleotide sequence of SEQ ID NO: 1.

Another embodiment of the present invention provides a pharmaceutical composition for suppressing appetite or preventing, ameliorating or treating metabolic diseases, comprising the *Akkermansia muciniphila* SNUG-61027 (accession number KCTC 13530BP) strain or its culture solution as an active ingredient.

The term "culture solution" as used herein refers to the whole medium solution comprising the strain, its metabolite, extra nutrients, etc. obtained by culturing the strain for a certain period of time in a medium capable of supplying nutrients so that *Akkermansia muciniphila* SNUG-61027 (accession number KCTC 13530BP) strain can grow and survive in vitro, but this is a concept including all of cell free culture supernatants, and extracts and fractions thereof. The liquid from which the cells have been removed from the culture solution is also referred to as "supernatant", and the supernatant may be obtained by leaving the culture solution for a certain period of time and taking only the liquid in the upper layer excluding the precipitated part in the lower layer, by removing the bacterial cells through filtration, or by centrifuging the culture solution to remove the precipitate in the lower part and taking only the liquid in the upper part.

The "bacterial cell" refers to the strain itself of the present invention, and includes the strain itself isolated and selected from the fermented food, or the strain separated from the culture solution obtained by culturing the isolated strain. The bacterial cells can be obtained by centrifuging the culture solution to take a portion precipitated in the lower layer, or by leaving the culture solution for a certain period of time and then removing the liquid in the upper part since the cells precipitates to the lower layer of the culture solution due to gravity.

Further, the extract of the strain culture solution, bacterial cell or supernatant of *Akkermansia muciniphila* SNUG-61027 (accession number KCTC 13530BP) of the present invention may be an extract extracted with ethyl acetate (EtOAc) or ethanol (ethyl alcohol; EtOH), but is not limited thereto. Moreover, the fraction of the culture solution, bacterial cell, or supernatant of *Akkermansia muciniphila* SNUG-61027 strain of the present invention may be a fraction obtained by fractionating the ethyl acetate extract with methanol, but is not limited thereto. The fraction of the culture solution, supernatant or extract of *Akkermansia muciniphila* (accession number KCTC 13530BP) strain of the present invention can be obtained according to a conventional fractionation method well known in the art, and for example, it can be obtained by a chromatography method using an anion exchange column, a size column or the like.

The term "metabolic disease" as used herein means that one or two or more disorders of various diseases such as impaired glucose tolerance, diabetes, fatty liver, hypertension, dyslipidemia, obesity, cardiovascular atherosclerosis, etc. which are caused by chronic metabolic disorders, appear in one individual. For example, the metabolic disease may be any one selected from impaired glucose tolerance, diabetes, arteriosclerosis, hyperlipidemia, hypercholesterolemia, fatty liver, cardiovascular disease, and obesity.

According to the present invention, the induction of an increased IL-6 level, an increased GLP-1 secretion, and an increased activity of brown fat can exhibit a beneficial effect on the metabolic diseases, and further, prevents, ameliorates or treats the metabolic diseases.

Another embodiment of the present invention provides a pharmaceutical composition for suppressing appetite or preventing, ameliorating or treating metabolic diseases, comprising a B2UM07 protein consisting of an amino acid sequence of SEQ ID NO: 2 as an active ingredient.

The B2UM07 protein was identified through NCBI Database matching of a conventional strain, when performing the protein identification in the efficacy fraction of the present invention using LC/MS-MS, and the information is as follows.

Gene: Amuc_1631
UniProtKB—B2UM07
Protein name—Carboxyl-terminal protease
Organism: *Akkermansia muciniphila*

The B2UM07 protein may be derived from *Akkermansia muciniphila* strain, and specifically, the *Akkermansia muciniphila* strain may be SNUG-61027 strain (accession number KCTC 13530BP).

In addition to the protein consisting of the amino acid sequence of SEQ ID NO: 2, variants of the sequence are also considered to be included within the scope of the present invention. The variants are protein consisting of an amino acid sequence or an amino acid sequence encoded by a nucleotide sequence having functional characteristics similar to the amino acid sequence of SEQ ID NO: 2, although the nucleotide sequence or the amino acid sequence changes. Specifically, the protein of present invention may comprise an amino acid sequence having at least 70%, more preferably at least 80%, even more preferably at least 90%, and most preferably at least 95% sequence homology with the amino acid sequence of SEQ ID NO: 2.

Further, the present invention provides a gene encoding the B2UM07 protein. The gene of the present invention comprises both genomic DNA and cDNA encoding the B2UM07 protein, respectively. Preferably, the gene may comprise a nucleotide sequence encoding the protein of SEQ ID NO: 2.

Further, variants of the nucleotide sequence are included within the scope of the present invention. Specifically, the variant genes may comprise a nucleotide sequence having at least 60%, more preferably at least 70%, even more preferably at least 80%, most preferably at least 90% sequence homology with the nucleotide sequence encoding the protein of SEQ ID NO: 2.

Another aspect of the present invention provides a recombinant vector comprising a gene encoding the B2UM07 protein of the present invention. The term "recombinant" as used herein refers to a cell in which a cell replicates a heterologous nucleic acid, expresses the nucleic acid, or expresses a peptide, a heterologous peptide, or a protein encoded by a heterologous nucleic acid. A recombinant cell may express genes or gene segments of the cell that are not found in the natural form, either in a sense or antisense form. Further, the recombinant cell can express genes found in cells of natural state, but the gene is modified and re-introduced into the cell by artificial means.

The "vector" is used to refer to a DNA fragment(s) or a nucleic acid molecule that is delivered to the cell interior. The vector can replicate DNA and can be reproduced independently in host cells. Further, the present invention provides a transformant transformed with the recombinant vector. As a method of transforming a vector into *E. coli*, a method commonly known in the art such as the use of a competent cell using a $CaCl_2$) buffer, electroporation, and heat shock may be used. As the method of culturing the transformed *E. coli*, a method for culturing *E. coli* commonly used in the art may be used.

The pharmaceutical composition of the present invention can be administered to mammals including humans by various routes. The term "administration" as used herein means introducing a predetermined substance into an individual using any suitable method, and the mode of administration may be any of the modes commonly used in the art, for example, the substance may be administered by oral, skin, intravenous, intramuscular, subcutaneous routes or the like, and preferably, it can be administered by an oral route. The pharmaceutical composition of the present invention may be used after being formulated into an oral preparation, such as powders, granules, tablets, capsules, suspensions, emulsions, syrups, or a non-oral preparation, such as ointments, aerosols, transdermal drugs, suppositories, and sterile injectable solutions, in accordance with a conventional method. The pharmaceutical composition of the present invention may further comprise pharmaceutically suitable and physiologically acceptable adjuvants such as carriers, excipients and diluents, etc.

Carriers, excipients and diluents that can be comprised in the pharmaceutical composition of the present invention may be lactose, dextrose, sucrose, sorbitol, mannitol, xylitol, erythritol, maltitol, starch, acacia gum, alginate, gelatin, calcium phosphate, calcium silicate, cellulose, methyl cellulose, microcrystalline cellulose, polyvinyl pyrrolidone, water, methyl hydroxybenzoate, propyl hydroxybenzoate, talc, magnesium stearate, and mineral oil. When formulated into a preparation, a diluting agent or an excipient, such as commonly-used fillers, weighting agents, binding agents, wetting agents, disintegrating agents, surfactants can be used.

In a specific embodiment where the pharmaceutical composition of the present invention is applied to humans, the pharmaceutical composition of the present invention may be administered alone, but considering the mode of administration and the standard pharmaceutical practice, it can be generally administered by mixing with the selected pharmaceutical carrier. For example, the composition comprising the *Akkermansia muciniphila* strain of the present invention may be orally, intrabuccally, or sublingually administered in a tablet form comprising starch or lactose, in a capsule form comprising only the active ingredient of the present invention or comprising an excipient in addition to the active ingredient, or in an elixir or suspension form comprising a chemical agent for flavor or color.

The dose of the pharmaceutical composition of the present invention may vary depending on the patient's age, weight, sex, dosage form, health condition and severity of disease and it can be administered once to several times a day in divided doses at fixed time intervals according to the decision of a doctor or pharmacist. For example, the daily dose may be 0.1 to 500 mg/kg, preferably 0.5 to 300 mg/kg, based on the content of the active ingredient. The above doses are exemplified as an average case, and its dose may increase or decrease depending on individual differences.

Another embodiment of the present invention provides a health functional food for suppressing appetite or ameliorating or alleviating metabolic diseases, comprising *Akkermansia muciniphila* strain SNUG-61027 (accession number KCTC 13530BP), or a culture solution, supernatant, extract or fraction thereof as an active ingredient.

The metabolic disease may be impaired glucose tolerance, diabetes, arteriosclerosis, hyperlipidemia, hypercholesterolemia, fatty liver, cardiovascular disease, or obesity.

According to the present invention, an increased IL-6 level, an increased GLP-1 secretion, and an increased brown fat activity can be induced, thereby exhibiting a beneficial effect on the metabolic diseases, and further, the metabolic diseases can be alleviated or treated.

In addition, the present invention provides a health functional food for suppressing appetite or ameliorating or alleviating metabolic diseases, comprising a B2UM07 protein consisting of an amino acid sequence of SEQ ID NO: 2 as an active ingredient.

The metabolic disease may be impaired glucose tolerance, diabetes, arteriosclerosis, hyperlipidemia, hypercholesterolemia, fatty liver, cardiovascular disease, or obesity.

The B2UM07 protein may be derived from *Akkermansia muciniphila* strain, and specifically, the *Akkermansia muciniphila* strain may be SNUG-61027 strain (accession number KCTC 13530BP), and the details are as described above.

The health functional food may be various beverages, fermented milk, food additives, and the like.

The content of the *Akkermansia muciniphila* strain as an active ingredient contained in the health functional food is not particularly limited, but may appropriately vary depending on the form of food, desired use or the like, for example, it can be added in an amount of 0.01 to 15% by weight of the total weight of the food, and the health beverage composition may be added in an amount of 0.02 to 10 g, preferably 0.3 to 1 g, based on 100 ml.

In the beverage among the health functional food of the present invention, there is no particular limitation on the liquid ingredient, except that the *Akkermansia muciniphila* strain is comprised as an essential ingredient at the indicated ratio, and various flavoring agents or natural carbohydrates may be comprised as additional ingredients as in common beverages.

Examples of the above-mentioned natural carbohydrates may be common saccharides such as monosaccharides, for example, glucose, fructose, and the like, disaccharides, for example, maltose, sucrose, and the like, and polysaccharides, for example, dextrin, cyclodextrin, and the like, and sugar alcohols, such as xylitol, sorbitol, erythritol, and the like. As flavoring agents other than those mentioned above, natural flavoring substances (thaumatin, stevia extract (for example, rebaudioside A, glycyrrhizin, etc.) and synthetic flavoring agents (saccharin, aspartame, etc.) may be favorably used. The ratio of the natural carbohydrate is generally about 1 to 20 g, preferably about 5 to 12 g per 100 ml of the composition of the present invention.

In addition to the above, the health functional food of the present invention may comprise various nutrients, vitamins, minerals (electrolyte), flavoring agents such as synthetic flavoring agents and natural flavoring agents, coloring agents and enhancers (cheese, chocolate, etc.), pectic acid and salts thereof, alginic acid and salts thereof, organic acids, protective colloidal thickening agents, pH controlling agents, stabilizing agents, preservatives, glycerin, alcohol, carbonizing agents as used in carbonated beverages, and the like.

Moreover, the health functional food of the present invention may comprise fruits, as used in preparing natural fruit juices and fruit juice beverages and vegetable beverages. These components can be used independently or in combination. Although the proportion of these additives is not of great importance, it is generally selected from a range of 0 to about 20 parts by weight per 100 parts by weight of the health functional food of the present invention.

Another embodiment of the present invention provides a use of *Akkermansia muciniphila* SNUG-61027 strain (accession number KCTC 13530BP), or a culture solution, supernatant, extract or fraction thereof for suppressing appetite or preventing, treating, ameliorating or alleviating metabolic diseases.

The *Akkermansia muciniphila* SNUG-61027 strain (accession number KCTC 13530BP) used for the use of the present invention may comprise 16S rDNA consisting of the nucleotide sequence of SEQ ID NO: 1.

The metabolic disease to which the use of the present invention is applied may be impaired glucose tolerance, diabetes, arteriosclerosis, hyperlipidemia, hypercholesterolemia, fatty liver, cardiovascular disease, or obesity.

In addition, another embodiment of the present invention provides a use of the B2UM07 protein consisting of the amino acid sequence of SEQ ID NO: 2 for suppressing appetite or preventing, treating, ameliorating or alleviating metabolic diseases.

The B2UM07 protein used for the use of the present invention may be derived from *Akkermansia muciniphila* strain.

The *Akkermansia muciniphila* strain used for the use of the present invention may be SNUG-61027 strain (accession number KCTC 13530BP).

The present invention provides a method of suppressing appetite or preventing, treating, ameliorating or alleviating metabolic diseases, comprising a step of treating *Akkermansia muciniphila* SNUG-61027 strain (accession number KCTC 13530BP), or a culture solution, supernatant, extract or fraction thereof.

The *Akkermansia muciniphila* SNUG-61027 strain (accession number KCTC 13530BP) used in a method of suppressing appetite or preventing, treating, ameliorating or alleviating metabolic diseases may comprise 16S rDNA consisting of the nucleotide sequence of SEQ ID NO: 1.

The metabolic disease to which the method of the present invention is applied may be impaired glucose tolerance, diabetes, arteriosclerosis, hyperlipidemia, hypercholesterolemia, fatty liver, cardiovascular disease, or obesity.

The present invention provides a method of suppressing appetite or preventing, treating, ameliorating or alleviating metabolic diseases, comprising a step of treating a B2UM07 protein consisting of the amino acid sequence of SEQ ID NO: 2.

The B2UM07 protein used in the method of the present invention may be derived from *Akkermansia muciniphila* strain.

The *Akkermansia muciniphila* strain used in the method of the present invention may be SNUG-61027 strain (accession number KCTC 13530BP)

Advantageous Effects

The present invention confirmed the effect of activating a brown fat and the ability to secrete the appetite regulating hormone GLP-1, in addition to the weight reduction and glucose homeostasis regulation among anti-obesity effects of *Akkermansia muciniphila*, and also confirmed that these efficacies are dependent on a specific cytokine in the host, IL-6. In addition, the present invention has identified a novel *Akkermansia muciniphila* SNUG-61027 strain (accession number KCTC 13530BP) with significantly enhanced ability of GLP-1 induction, and has confirmed that the B2UM07 (P9) protein isolated from the culture solution of *Akkermansia muciniphila* strain showed remarkably excellent ability of GLP-1 induction, ability of maintaining intra-body glucose homeostasis, and an effect of reducing body weight. Therefore, the novel *Akkermansia muciniphila* strain and B2UM07 protein may be usefully used for suppressing appetite, or treating or preventing metabolic diseases.

DETAILED DESCRIPTION OF THE EMBODIMENTS

Hereinafter, the present invention will be described with reference to examples. However, these examples are for illustrative purposes only, and the scope of the present invention is not limited thereto.

Example 1. Analysis of Effect of Reducing Liver and Brown Fat Weight after Administration of *Akkermansia muciniphila* (Akk) Strain to a High Fat Diet Mouse Model

Figure 1A:
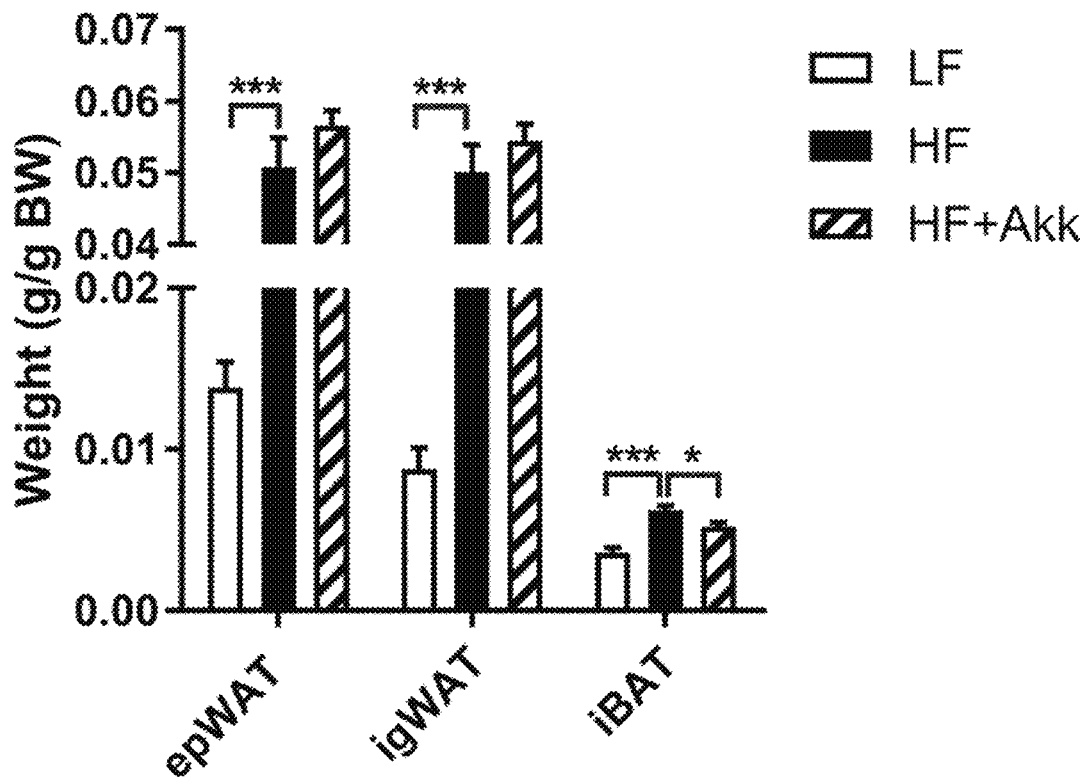
FIG. 1 shows the results of experiments for the improved effect on liver and brown fat weight after administration of *Akkermansia muciniphila* (Akk) strain to a high fat diet mouse model.

*Akkermansia muciniphila* (ATCC BAA-835, Akk) strain was anaerobically cultured in a brain heart infusion (BHI) solid medium supplemented with 0.5% mucin for 72 hours, and stocks were ensured. The strain was orally administered daily to 6-week-old male C57BL/6 mice at a concentration of $4 \times 10^8$ CFU/200 µl/mouse at the same time as the ingestion of a high fat diet (60% fat) (HF+Akk, n=8/group). A group that ingested a low-fat diet (10% fat) feed (LF) and a group that ingested only a high fat diet feed (HF) were used as control groups. After 14 weeks, the control groups and the strain administered group were compared. After fasting for 16 hours, adipose tissue and liver tissue were collected, and the tissue weight was measured (FIG. 1A).

Figure 1B:
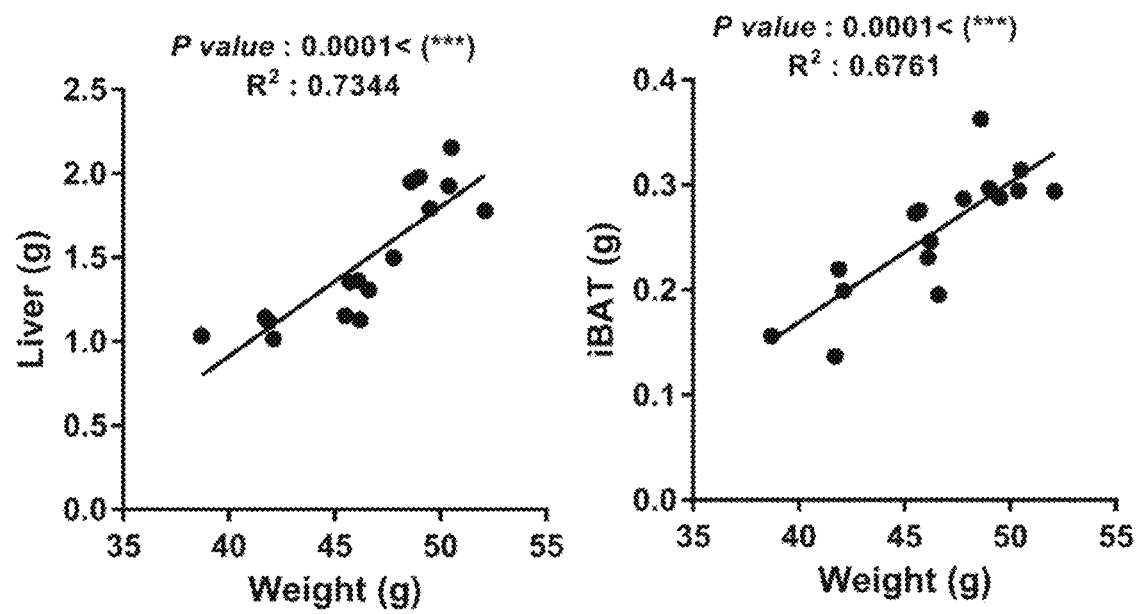

As a result, it was confirmed that there was no significant change in the weight of the inguinal white adipose tissue (igWAT) and epididymal white adipose tissue (EpiWAT) of the HF+Akk group compared to the HF group, but the weight of interscapular brown adipose tissue (iBAT) was significantly reduced. Further, when a correlation analysis of brown adipose (iBAT) and liver tissue weight with body weight was performed (FIG. 1B), it was confirmed that the brown adipose and liver tissue weight were in significant proportion to body weight, whereby the reduction in brown fat and liver weight exposed the possible target tissues of *Akkermansia muciniphila*.

Figure 1C:
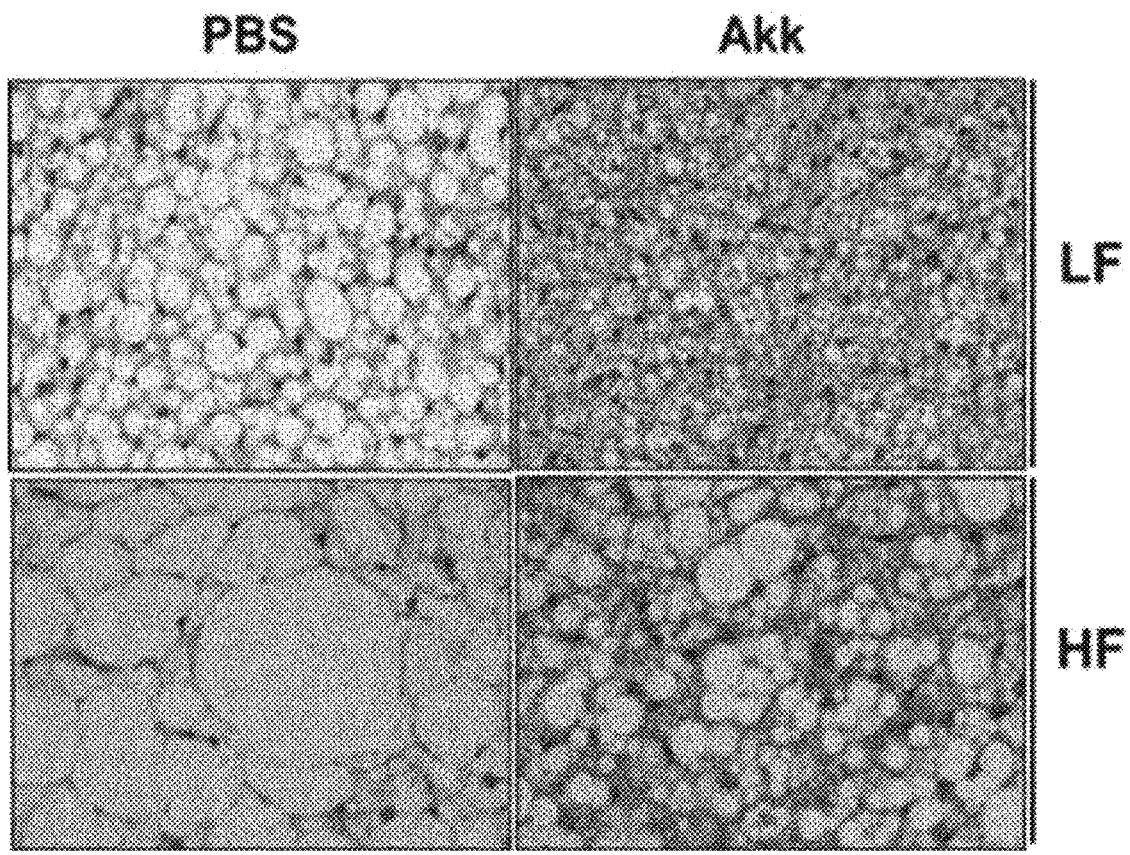
Figure 1D:
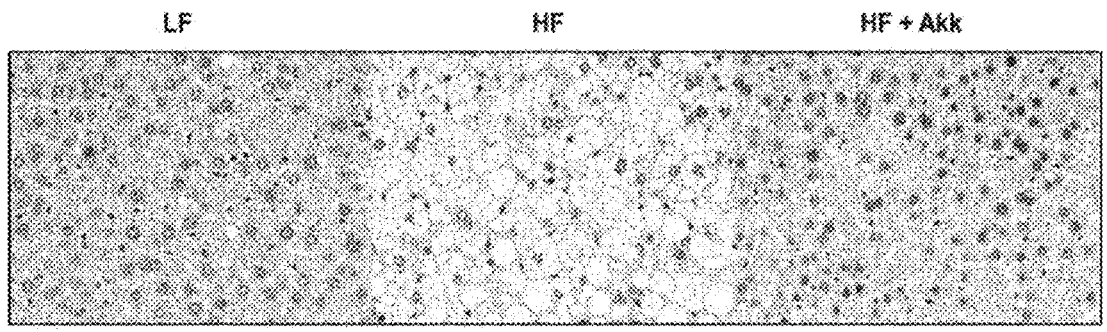

In addition, as a result of comparing the fat size of brown adipose tissue and liver tissue by group through hematoxylin eosin staining (H&E staining), it was observed that the adipocyte size of brown adipose tissue and liver tissue was significantly reduced in the *Akkermansia muciniphila* administered group compared to the control group (FIGS. 1C and D).

Therefore, as a result of the experiment, it was confirmed that *Akkermansia muciniphila* contributes to the reduction in the weight of brown adipose tissue, adipocyte size, and the weight of liver tissue (FIGS. 1A~1D).

Figure 2A:
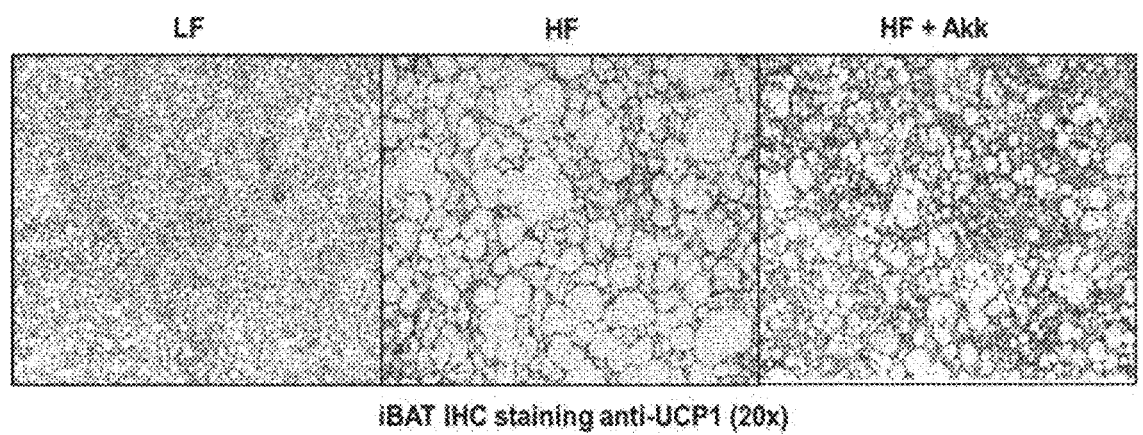
FIG. 2 shows the results of qPCR experiments confirming the increase of UCP-1 expression and markers related to brown fat by *Akkermansia muciniphila* strain.
Figure 2B:
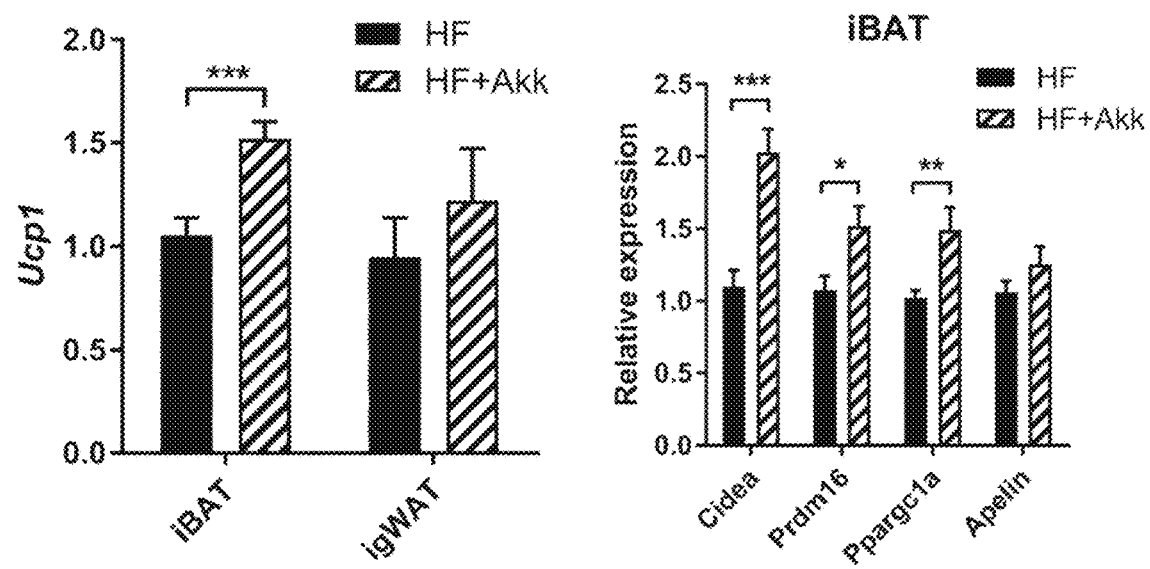

Example 2. Increase of UCP-1 Expression and Brown Fat-Related Markers by *Akkermansia muciniphila* Strain In brown adipose tissue (iBAT), uncoupling protein (UCP-1), which is a brown fat activation marker, was subjected to immuno-histochemistry (IHC) staining and compared for each group (FIG. 2A). After tissue RNA was extracted and cDNA was synthesized, the gene expression of UCP-1 was confirmed by qPCR, and brown fat differentiation-related markers (CIDEA, PRDM16, PPARGC1α, Apelin) were also confirmed (FIG. 2B).

As a result of the experiment, it was confirmed that brown adipose related markers in brown adipose tissue were significantly increased in the high fat induced mice fed with *Akkermansia muciniphila* compared to the non-fed group, and the increase was also confirmed in the results of tissue staining with UCP-1 factor, which is involved in brown fat activity. Thus, the mechanism of inducing brown adipose of *Akkermansia muciniphila* was confirmed.

Figure 3A:
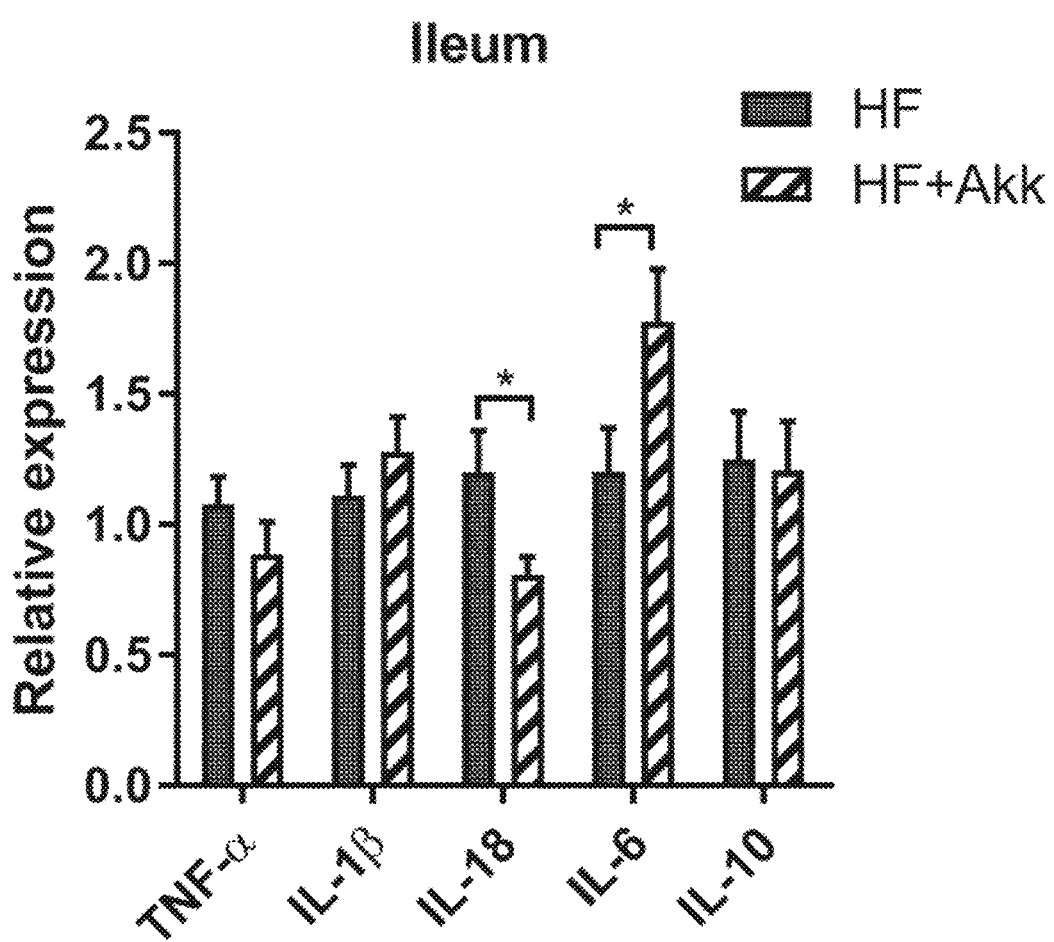
FIG. 3 shows the results of qPCR experiments confirming increase of IL-6 cytokine and GLP-1 in small intestine by *Akkermansia muciniphila* strain.
Figure 3B:
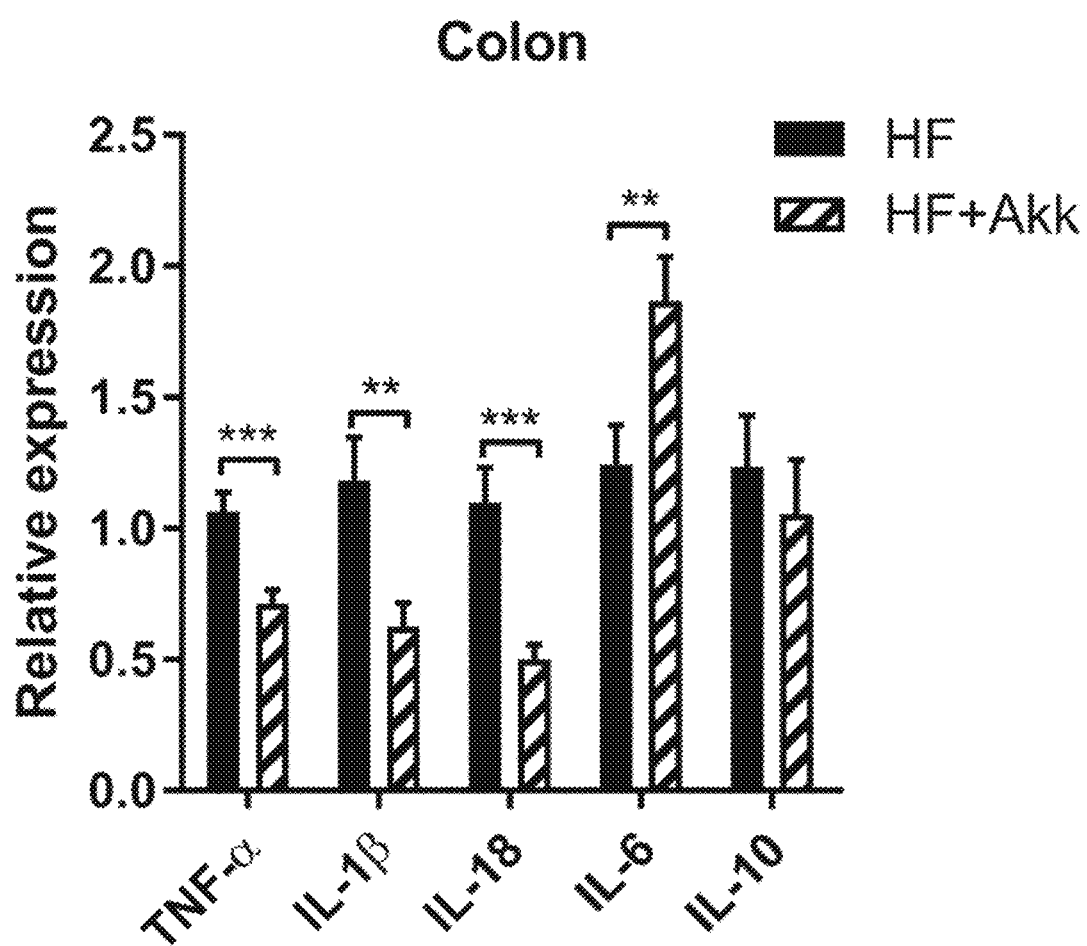

Example 3. Increase in IL-6 Cytokine and GLP-1 in Ileum and Colon by *Akkermansia muciniphila* Strain After extraction of RNA from ileum and colon tissues and synthesis of cDNA, the expression levels of immune cytokine markers (TNF-α, IL-1β, IL-18, IL-6, IL-10) was compared for each group (FIGS. 3A and B).

Figure 3C:
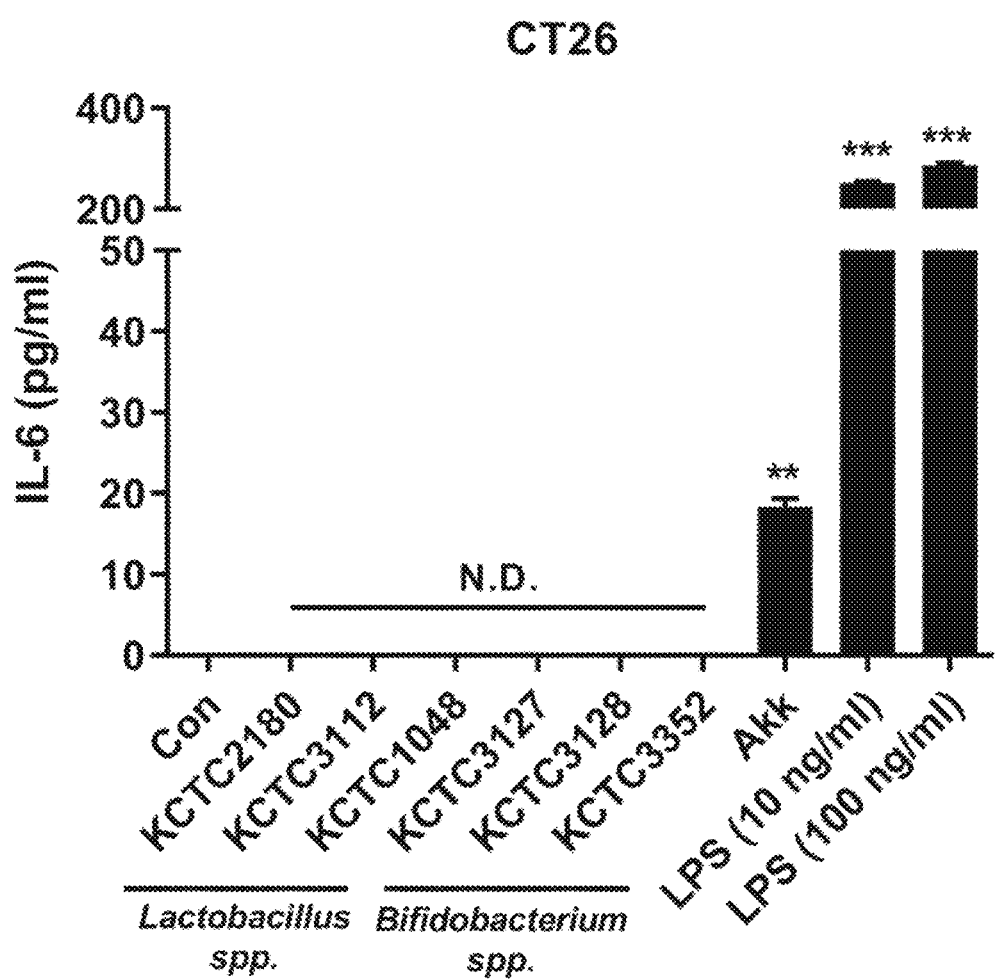

When a mouse intestinal cell line (CT26 cell) was treated with 3 types of *Lactobacillus* (KCTC2180, KCTC3112, KCTC1048), 3 types of *Bifidobacterium* (KCTC3127, KCTC3128, KCTC3352) or *Akkermansia muciniphila* (Akk), the capability of IL-6 cytokine expression was compared. Lipopolysaccharide (LPS) from *E. coli* was used as a positive control (FIG. 3C).

Figure 3D:
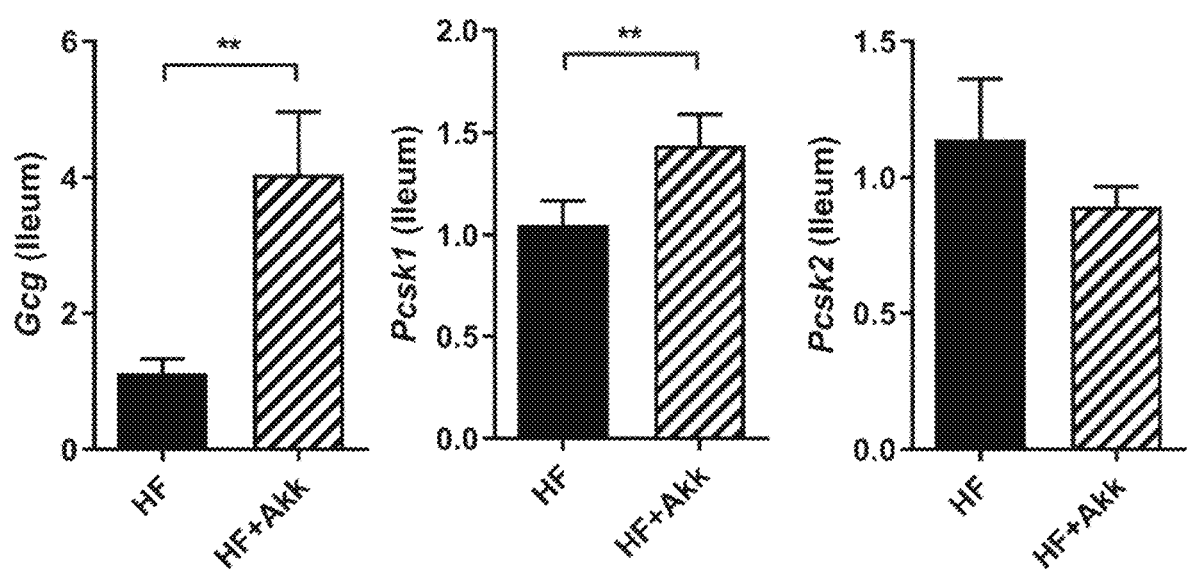

Related genes (gcg, pcsk1, pcsk2) inducing the secretion of intestinal secreted appetite-regulating hormone, glucagon-like peptide-1 (GLP-1) in ileum tissue were identified by qPCR (FIG. 3D).

As a result of the experiment, it was confirmed that IL-6 cytokine in the mouse ileum and colon cells was significantly increased by administration of *Akkermansia muciniphila*, and the secretion of the appetite regulating hormone, glucagon-like peptide-1 (GLP-1), in serum was significantly increased (FIGS. 3A to 3D). In particular, mouse ileum cell lines showed significantly increased IL-6 levels with *Akkermansia muciniphila* compared to other *Lactobacillus* and *Bifidobacterium* strains.

Example 4. Whether Brown Fat Manifestation and Exothermic Reaction by *Akkermansia muciniphila* Strain is Dependent on IL-6 Cytokine It was monitored whether the brown fat activation efficacy of *Akkermansia muciniphila* is dependent on IL-6 cytokine. For this purpose, 6-week-old male C57BL/6 wild type (WT) mice and IL-6 gene deficient mice (IL-6KO) mice were fed with high fat diet (60% high fat; HF) feed, respectively, and at the same time, the strain was orally administered daily at a concentration of $4\times10^8$ CFU/200 µl/mouse (N=6 in the IL-6KO group, n=8/group in the other groups). Groups that fed only a low fat diet (10% low fat; LF) or a high fat diet were used as control groups. After 14 weeks, WT mice and IL-6KO mice were compared between the group only fed the high fat diet and the group with administration of the strain.

Figure 4A:
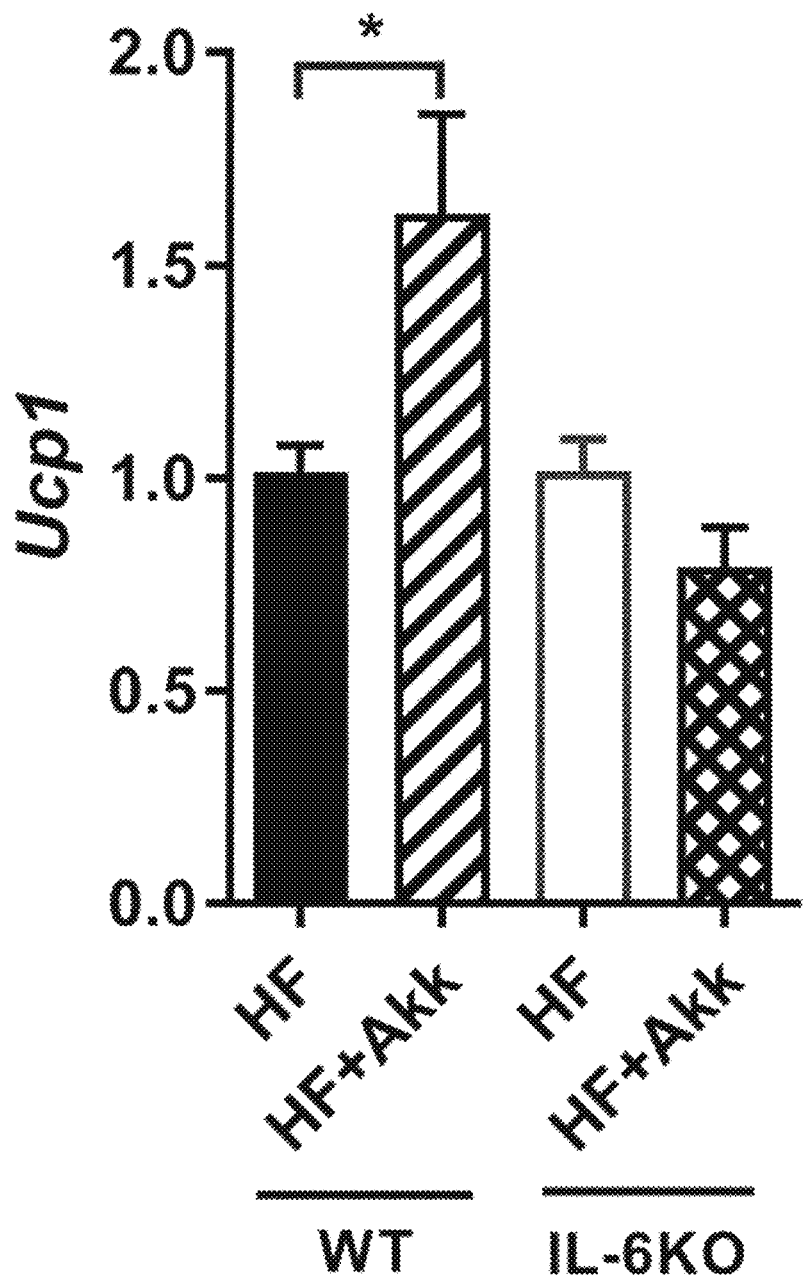
FIG. 4 shows the experimental result confirming that *Akkermansia muciniphila* strain-mediated manifestation of brown fat and thermogenesis are dependent on IL-6 cytokine.
Figure 4B:
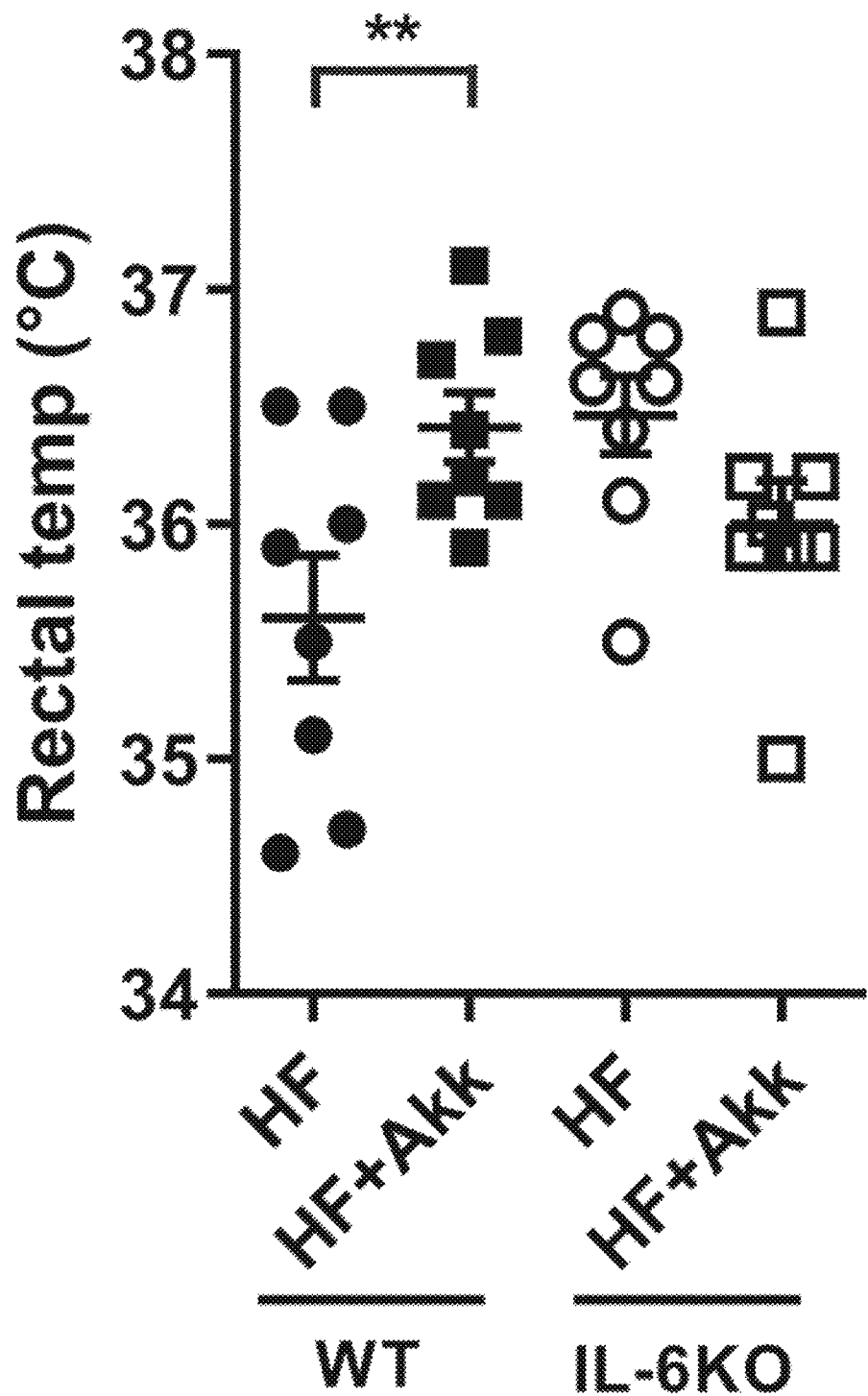
Figure 4C:
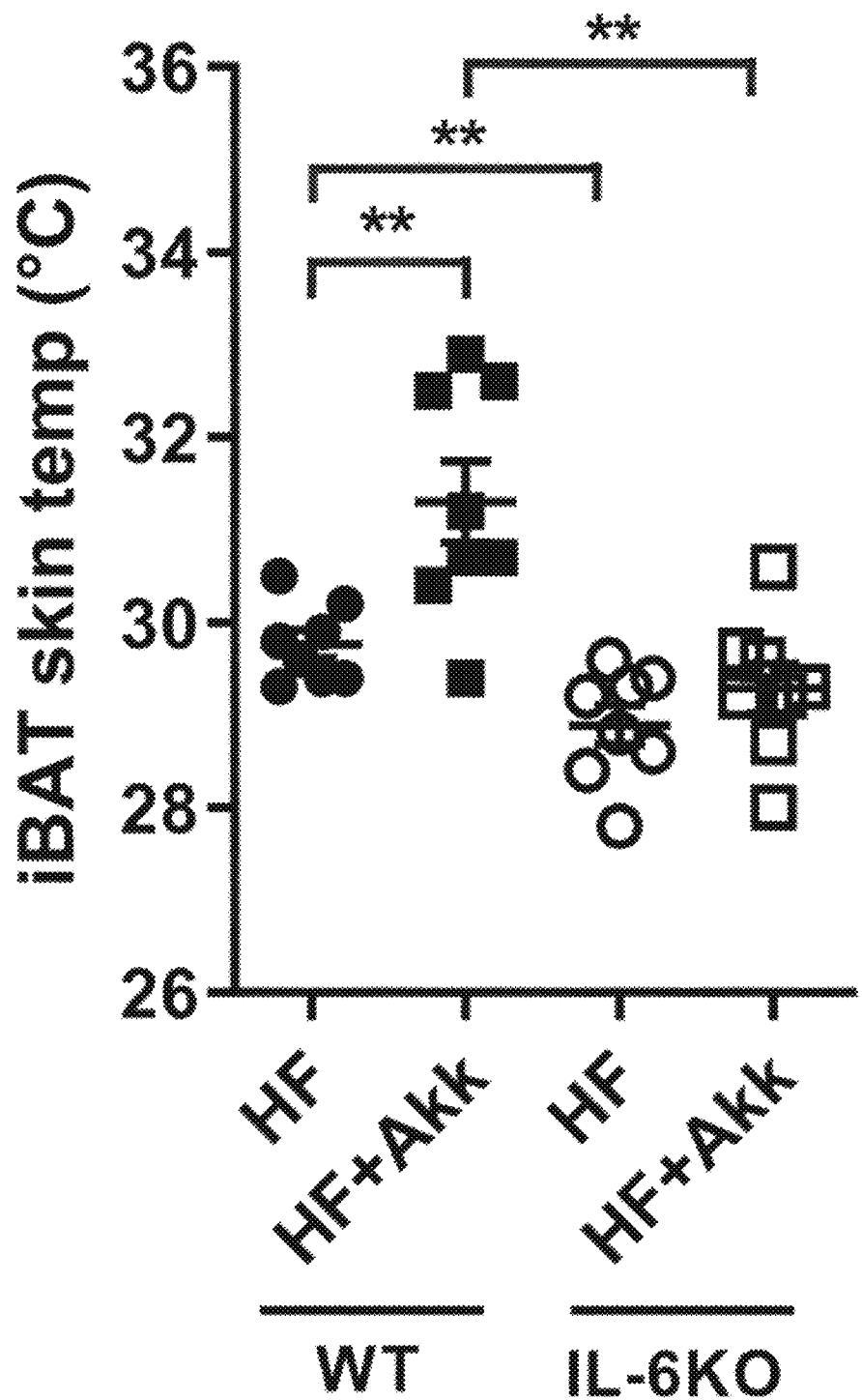

After 16 hours of fasting, brown adipose tissue was isolated, RNA was extracted, cDNA was synthesized, and then the expression of UCP-1 was confirmed by qPCR (FIG. 4A). Rectal temperature was measured by using a digital thermometer (TESTO925) (FIG. 4B). The skin temperature of the brown adipose tissue was measured using a thermal imaging camera (FLIR) (FIGS. 4C and D).

Figure 4D:
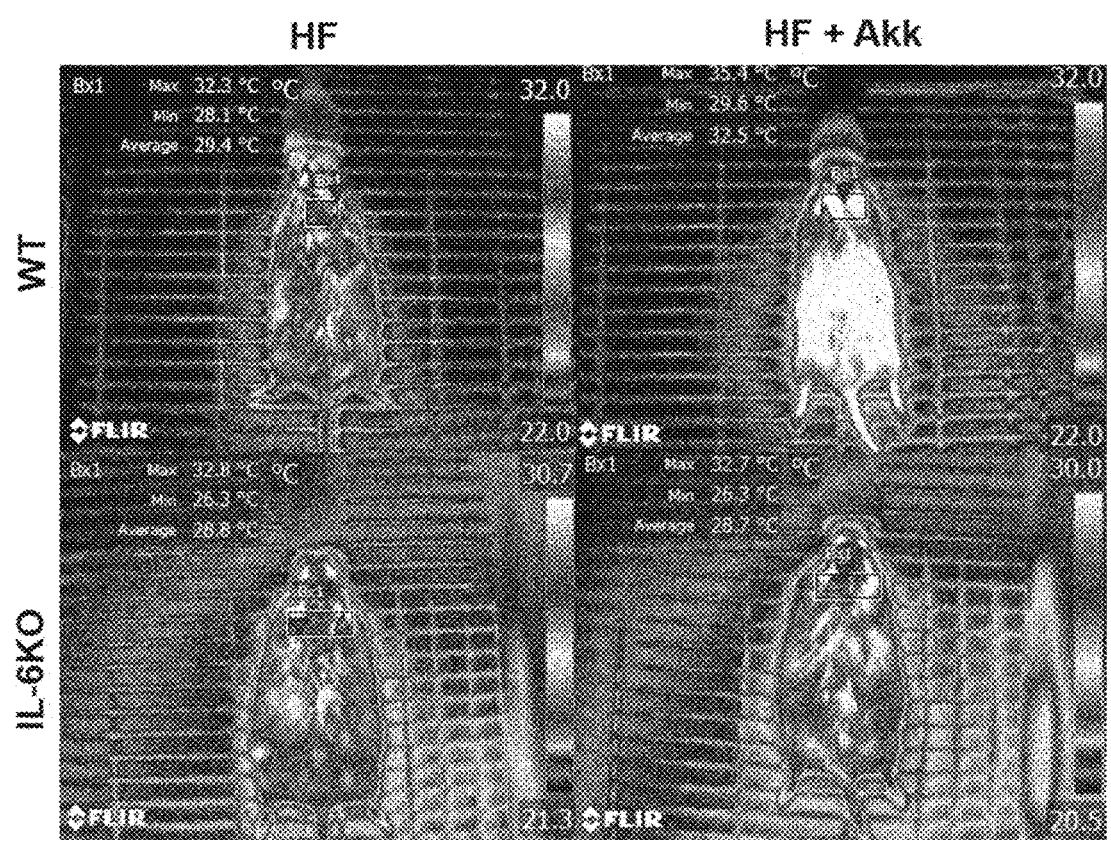
Figure 4E:
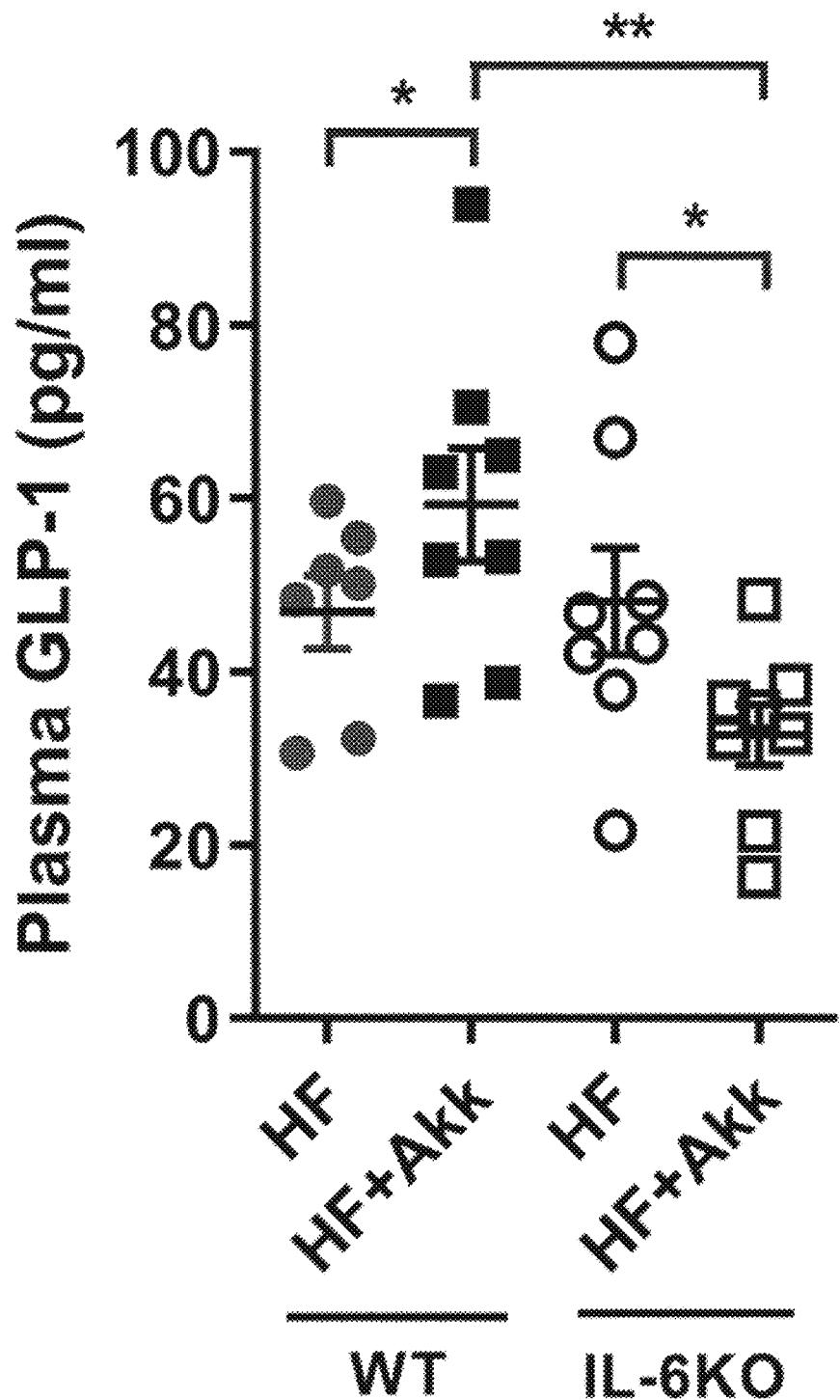

To measure the concentration of GLP-1 in serum, glucose was administered orally at a concentration of 2 g/kg after fasting for 5 hours in the morning. After 10 minutes, plasma was collected through retro-orbital sinus blood sampling and placed in a cold-maintained tube supplemented with 1 µg/ml diprotin A (6019; Tocris), which suppresses the half-life of GLP-1. After centrifugation (4,000×g, 10 min), the supernatant was frozen at −80° C. Thereafter, the secretion of GLP-1 was measured through a mouse GLP-1 ELISA kit (FIG. 4E).

Figure 4F:
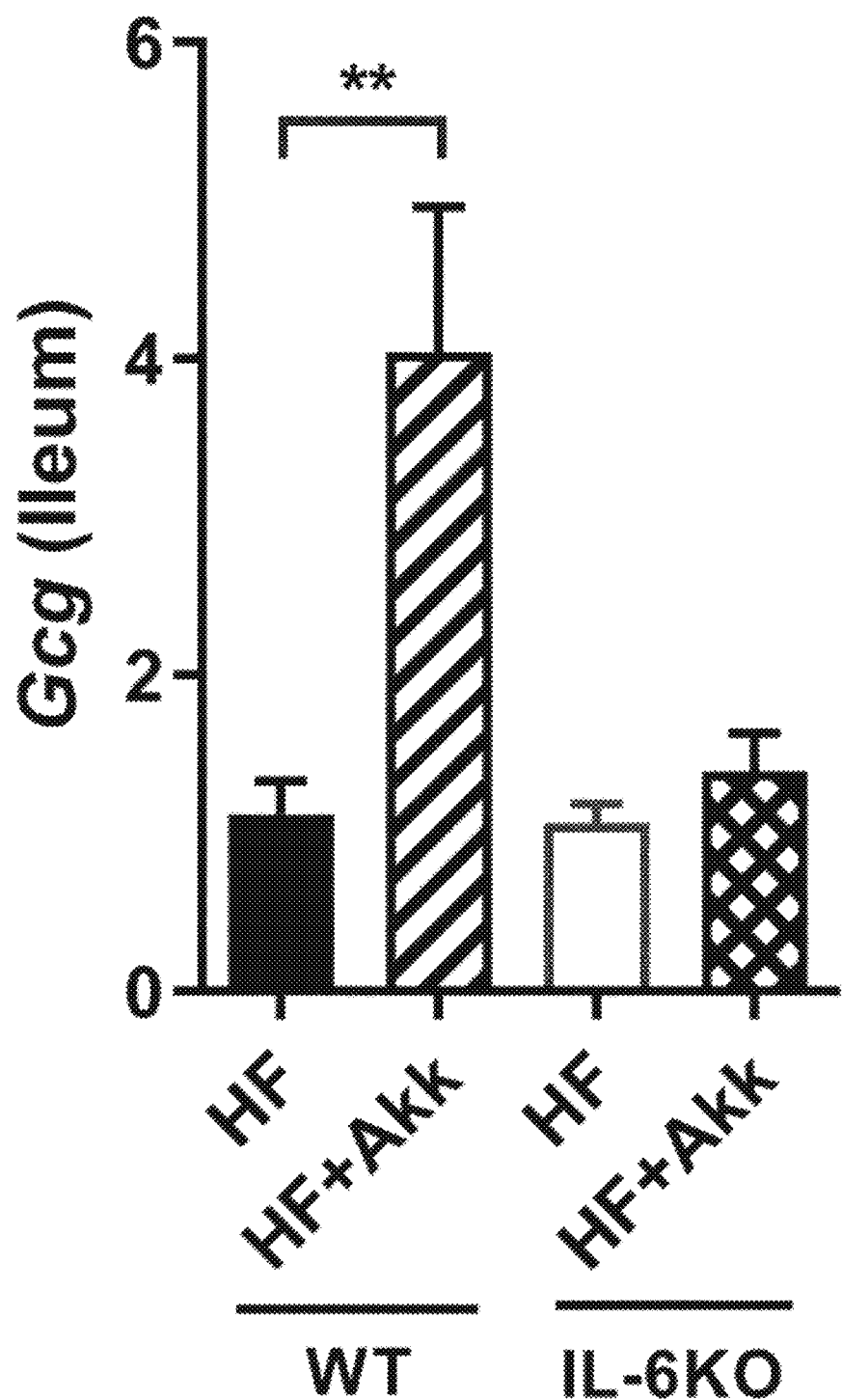
Figure 4G:
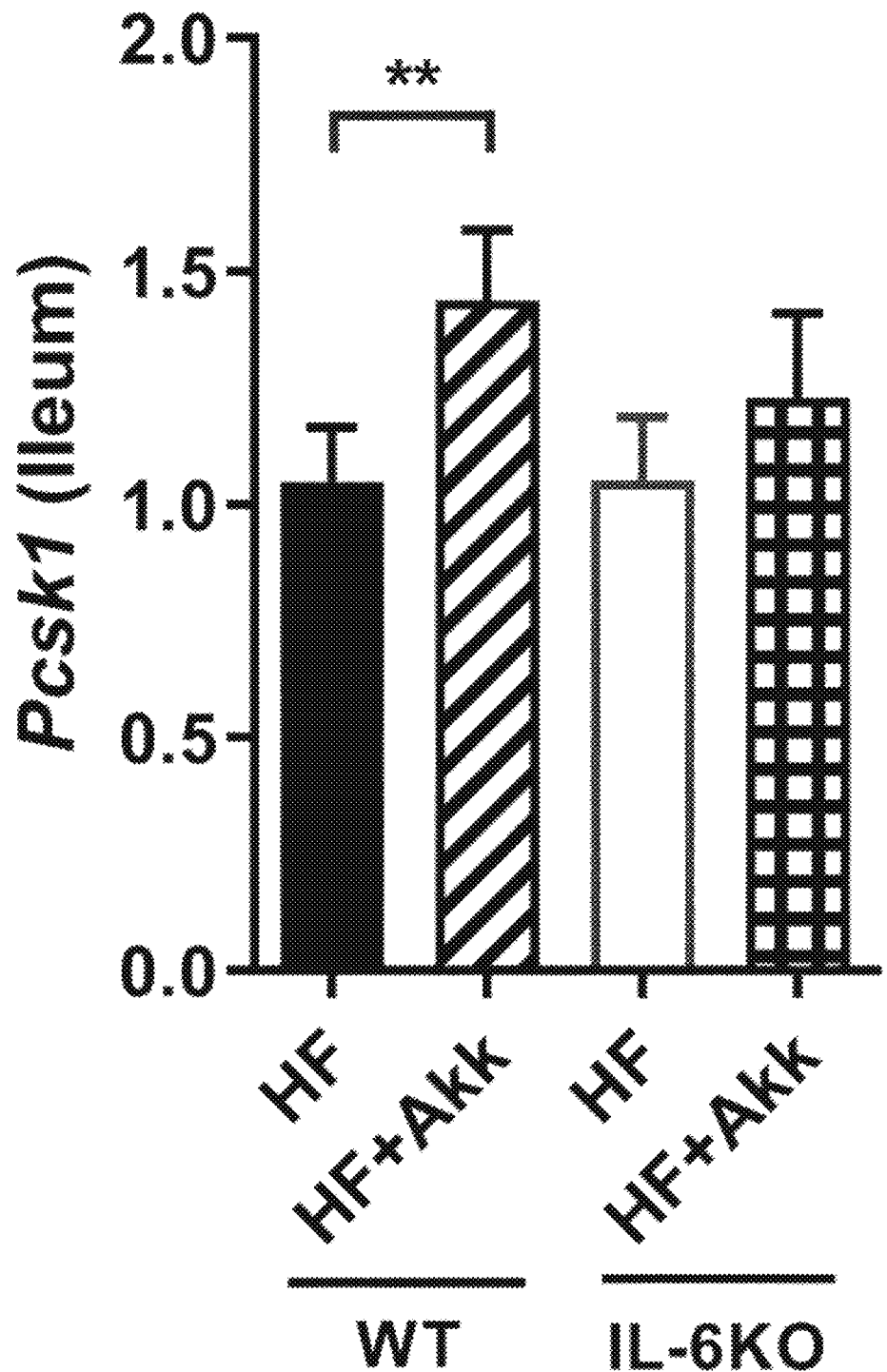
Figure 4H:
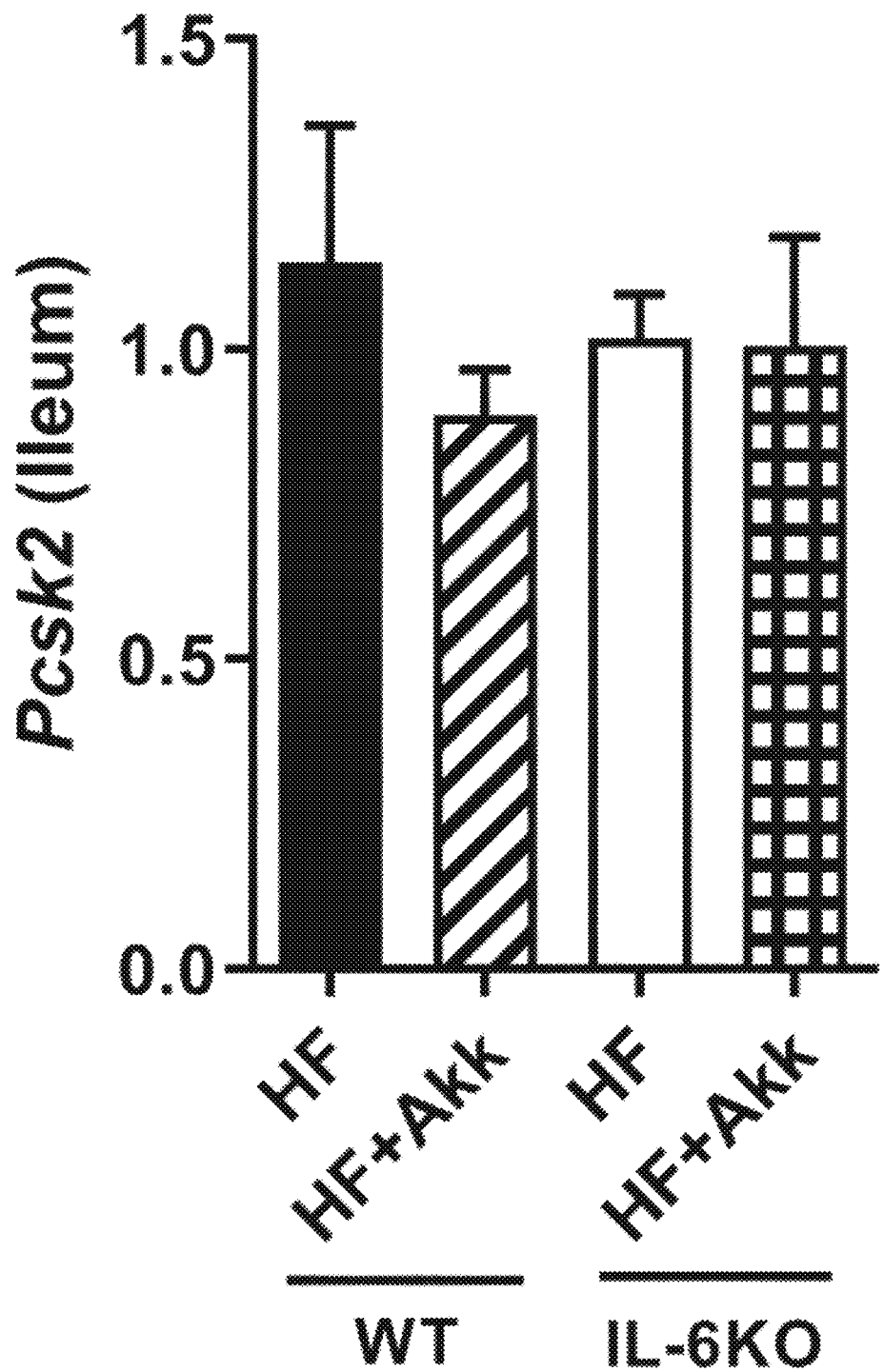

Genes related to inducing GLP-1 secretion (gcg, pcsk1, pcsk2) in ileum and colon tissues were evaluated by qPCR in WT mice and IL-6KO mice (FIGS. 4F~H).

As a result of the experiment, the expression of the brown fat-related gene UCP-1, whose expression was increased by administration of *Akkermansia muciniphila*, was not increased in IL-6 gene deficient mice (FIG. 4A). Also, when the skin surface temperature of the brown fat area was monitored with an infrared camera or measured with a rectal thermometer, it was confirmed that IL-6KO mice do not show the generation of heat due to brown fat activation (FIGS. 4B-4D). Further, unlike WT mice, the concentration of GLP-1 in serum was rather reduced in IL-6KO mice and there was no change in the level of genes (gcg, pcsk1, pcsk2) that induces the secretion of GLP-1, so it was confirmed that the increased GLP-1 of the appetite-regulating hormone in the ileum is also dependent on IL-6 (FIGS. 4E~H).

Example 5. Confirming that the Secretion of GLP-1 by *Akkermansia muciniphila* is Due to a Bacterial Secretion Substance (In Vitro)

Akk strain (*Akkermansia muciniphila* ATCC BAA-835) or *Akkermansia muciniphila* SNUG-61027 strain was cultured in 0.5% mucin medium, then cultured in a BHI medium supplemented with 0.1% or 5% fetal bovine serum (FBS) for 36 hours for the sake of liquid culture.

Figure 5:
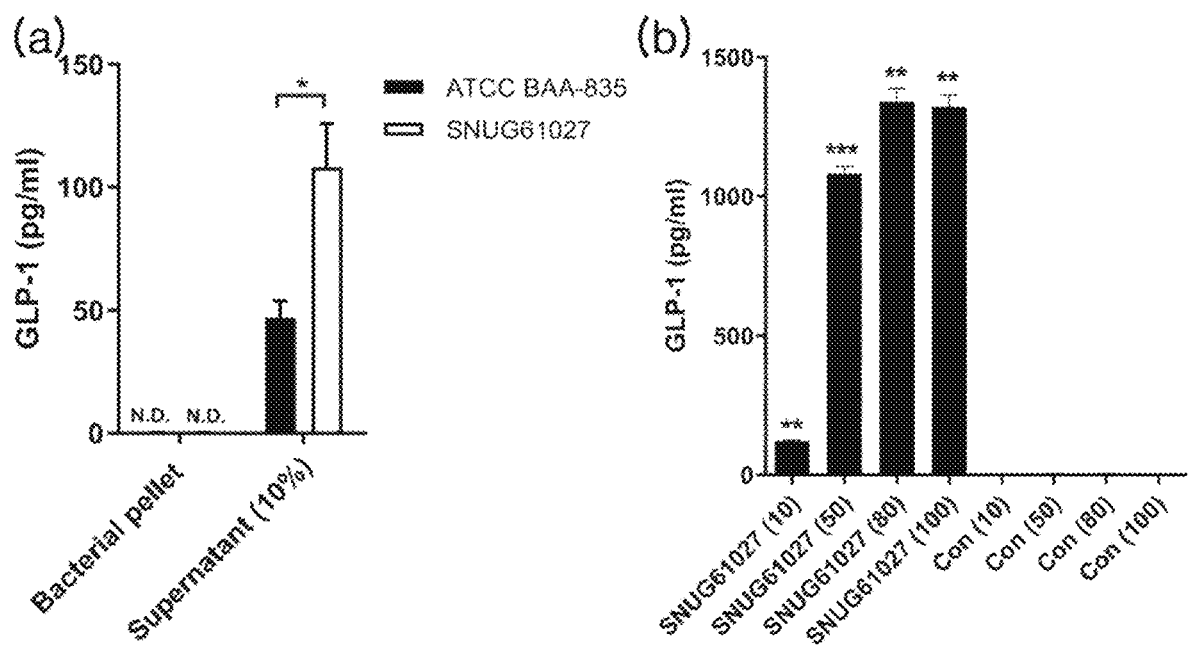
FIG. 5 shows the in vitro experimental result (ELISA) confirming that the GLP-1 secretion by *Akkermansia muciniphila* is caused by a bacterial secreted substance.

NCI-H716 (ATCC CCL-251) cell line secreting GLP-1 was seeded in a collagen-coated 96-well plate at a concentration of $2\times10^5$ cells/ml, and then in order to synchronize cell metabolism to glucose between cells, the cells were cultured in HBSS (Hanks Buffered Saline Solution) supplemented with 0.2% bovine serum albumin (BSA) for 2 hours. Then, Akk strain (ATCC BAA-835) or *Akkermansia muciniphila* SNUG-61027 bacterial pellet (ratio of bacterial cell to cell: 1:20) or cell free supernatant (CFS) was treated at a concentration of 10% v/v. After 2 hours, the supernatant was obtained, and the level of GLP-1 secretion in the supernatant was measured using an ELISA kit (FIG. 5A). In order to monitor the concentration dependent efficacy of GLP-1 secretion, the culture supernatant of the SNUG-61027 strain was treated at a concentration of 10 to 100% v/v, or that of *Bifidobacterium bifidum* (KBL483; isolated strain derived from the feces of a Korean person) as a control (con) was treated at a concentration of 10-100% v/v, in the same way as above, and after 2 hours of treatment supernatants were obtained and GLP-1 secretion in the supernatant were monitored (FIG. 5B).

As a result of the experiment, when the GLP-1 inducing cell line (L cells) was treated with the live bacterial cell and supernatant of *Akkermansia muciniphila*, it was confirmed that GLP-1 was not detected with live bacteria treatment whereas GLP-1 was highly secreted when treated with the supernatant, and the secretion level was significantly increased with SNUG-61027 strain than with ATCC BAA-835 (FIG. 5A). Further, when treated with the culture supernatant of the SNUG-61027 strain, the secretion level of GLP-1 was increased in a dose-dependent manner (FIG. 5B).

Example 6. Confirming that the Secretion of GLP-1 by *Akkermansia muciniphila* is Due to Other Factors Rather than Short-Chain Fatty Acids (In Vitro)

Figure 6:
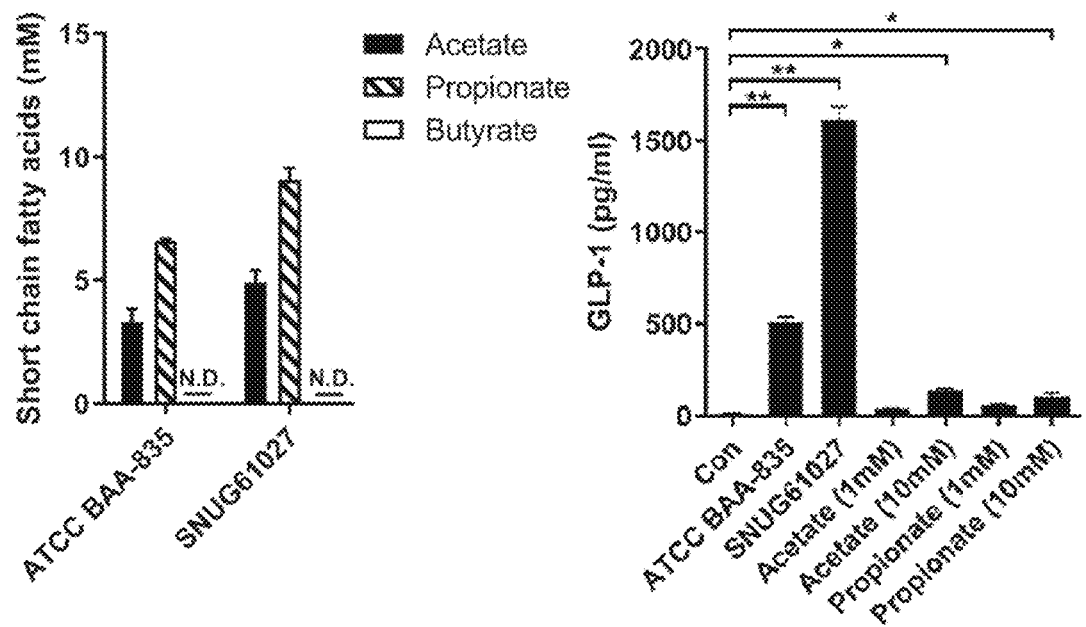
FIG. 6 shows the in vitro experimental result confirming that GLP-1 secretion by *Akkermansia muciniphila* is caused by elements other than short-chain fatty acid (SCFA).
Figure 7:
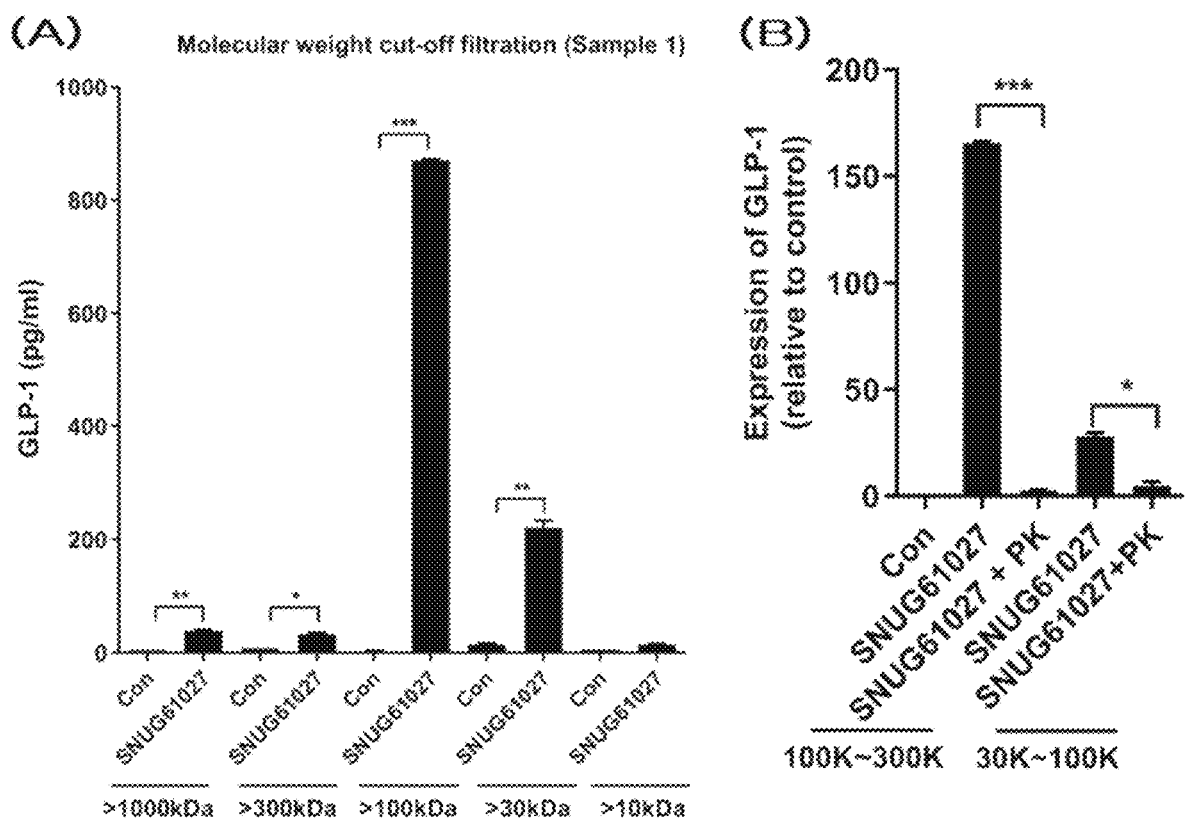
FIG. 7A shows the result of in vitro experiment to monitor the inducibility of GLP-1 by the size fractions of *Akkermansia muciniphila*.
FIG. 7B shows the result of experiment to monitor the GLP-1 secretion by the GLP-1 inducible fractions (100K, 300K) after proteinase K (PK) treatment.

For the analysis of short chain fatty acid (SCFA) secreted by *Akkermansia muciniphila*, the production of representative short-chain fatty acids, acetate, propionate, and butyrate was monitored using GC-MS (FIG. 6A). Two hours after treatment with acetate, propionate (1 mM, 10 mM) and strain culture supernatant (100% v/v), the secretion level of GLP-1 was monitored (FIG. 6B).

As a result of the experiment, it was confirmed that *Akkermansia muciniphila* secretes acetate and propionate (FIG. 6A). However, GLP-1 induced by acetate and propionate was significantly lowly quantified than GLP-1 induced by the culture supernatant of *Akkermansia muciniphila* (FIG. 6B). Therefore, it was found that element other than acetate and propionate is involved in the GLP-1 induced by *Akkermansia muciniphila*.

Figure 8A:
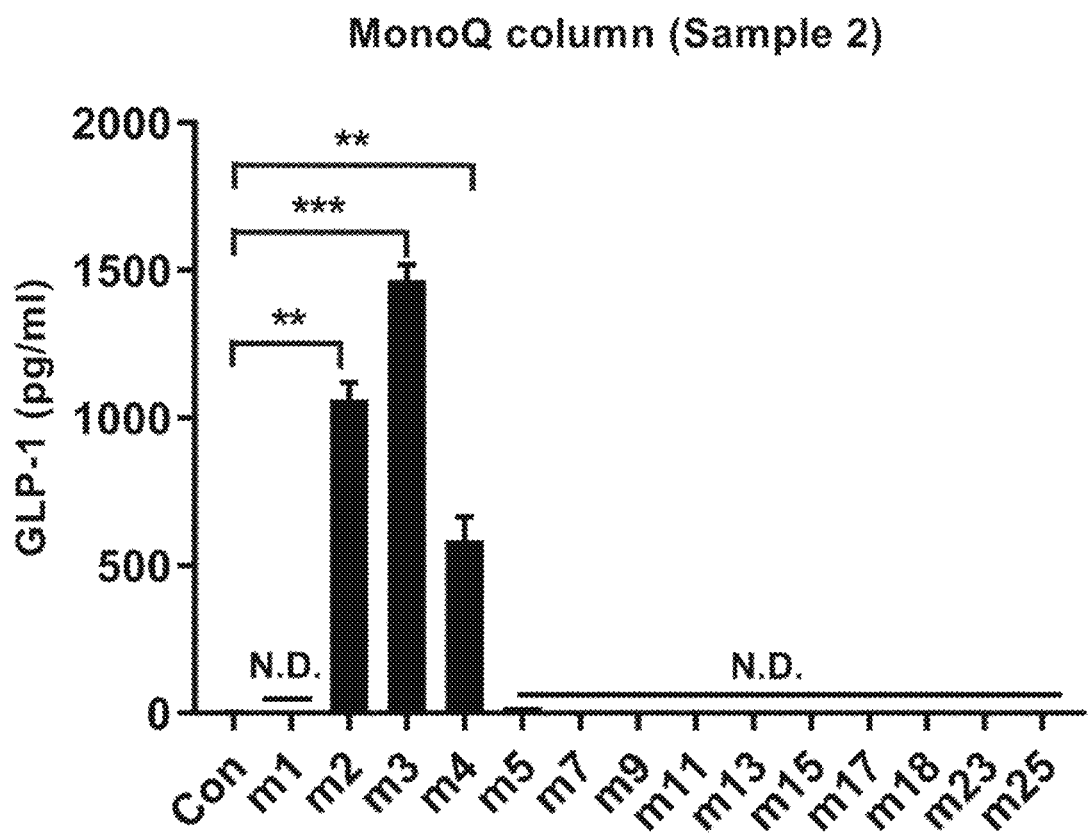
FIG. 8 shows the experimental results of anion-exchange column and size-exclusion column fractionation of GLP-1 inducible fraction (100K) for the fractions inducing GLP-1.

Example 7. Fractionation and Identification of GLP-1 Inducible Fraction (100K) Using A Size Filter, an Anion Exchange Column and A Size Column In order to separate the active substance in the culture solution, fractions were obtained using size filters. After concentrating them, monitoring the inducibility of GLP-1 confirmed that high level GLP-1 secretion was with the fraction of 100 kDa-300 kDa. Further, in order to remove the protein in the effective fractions (100K~300K, 30K~100K), proteinase K (PK) at a concentration of 100 µg/ml was treated at 55° C. for 1 hour, followed by inactivation at 90° C. for 10 minutes, and the GLP-1 secretion was measured. As a result, it was confirmed that the GLP-1 secretion was not induced by the protein-removed fraction. Through this, it was confirmed that GLP-1 secretion was induced by a protein in the fraction. To re-fractionate 100 kDa~300 kDa (100K) fraction of *Akkermansia muciniphila* supernatant, fast protein liquid chromatography (FPLC) was performed using a MonoQ anion exchange column (MonoQ 5/50, GE Healthcare) and an AKTAexplorer system (GE Healthcare). 80 µg/ml of 100K fraction was injected, and the sample was fractionated at a rate of 1 ml/min. Then, each fraction was treated with L cells, and the secretion level of GLP-1 was measured. As a result of the experiment, it was confirmed that GLP-1 was secreted to a high concentration by the m2-m4 fractions (FIG. 8A).

Figure 8B:
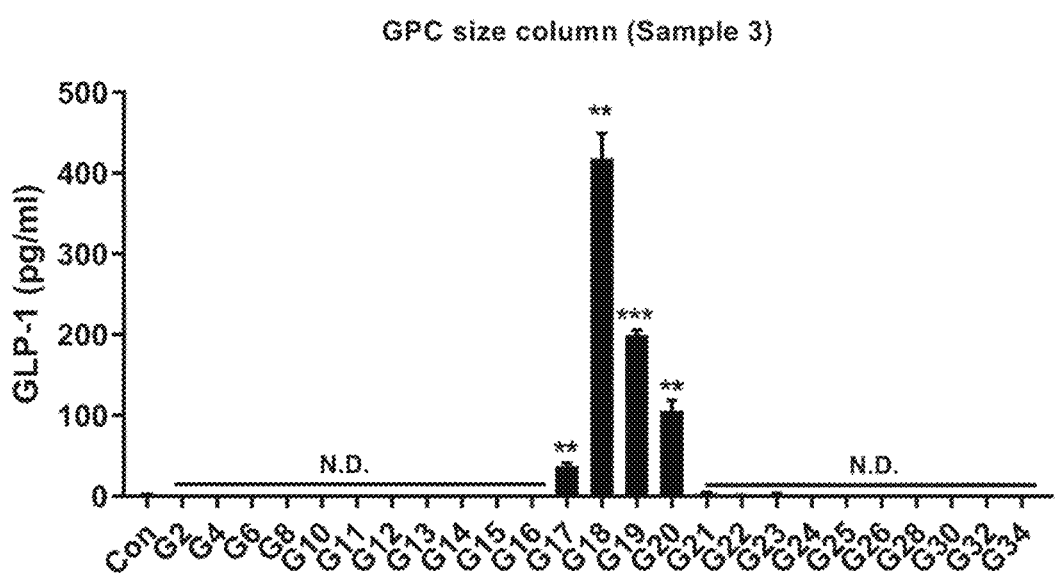

Then, the m2-m4 fractions were concentrated with a 30K filter, and the concentrated sample was performed FPLC again using a GPC size column (GPC/SEC). For fractionation, the sample was fractionated at a rate of 3 ml/min using a hiload 16/600 Superdex pg (GE Healthcare) AKTAexplorer system. In the same way, each fraction was treated on L cells, and the capability of GLP-1 secretion was confirmed. As a result of the experiment, it was confirmed that GLP-1 was secreted to a high level by the G17-G20 fractions (FIG. 8B).

Example 8. Qualitative Analysis of GLP-1 Inducible Fraction (100K, m2-m4, G17-G20) Protein of *Akkermansia muciniphila* Using LC/MS-MS Sample 1) 100K concentrate, Sample 2) MonoQ concentrate, and Sample 3) GPC concentrate, which were obtained from the supernatant of *Akkermansia muciniphila*, were analyzed qualitatively through LC/MS-MS. Bovine-related proteins that can be found in the basal medium of the supernatant were excluded, and the number of proteins identified in each fraction was monitored.

For this purpose, each sample obtained through size filters was qualitatively analyzed, 10 types of proteins or peptides appeared in GPC concentrate, which was considered to be the final concentrate, were listed by intensity, and was compared with the level of appearance in other fractions. LC-MS/MS (Nanoflow Easy-nLC 100/Q Exactive mass spectrometer) analysis instrument was used. It was processed using Maxquant software 1.5, and annotation was performed using the Universal Protein Resource (Uniprot) protein database to thereby qualitatively analyze proteins. For total proteins and peptides, only those with a false discovery rate <1% were selected.

Figure 9A:
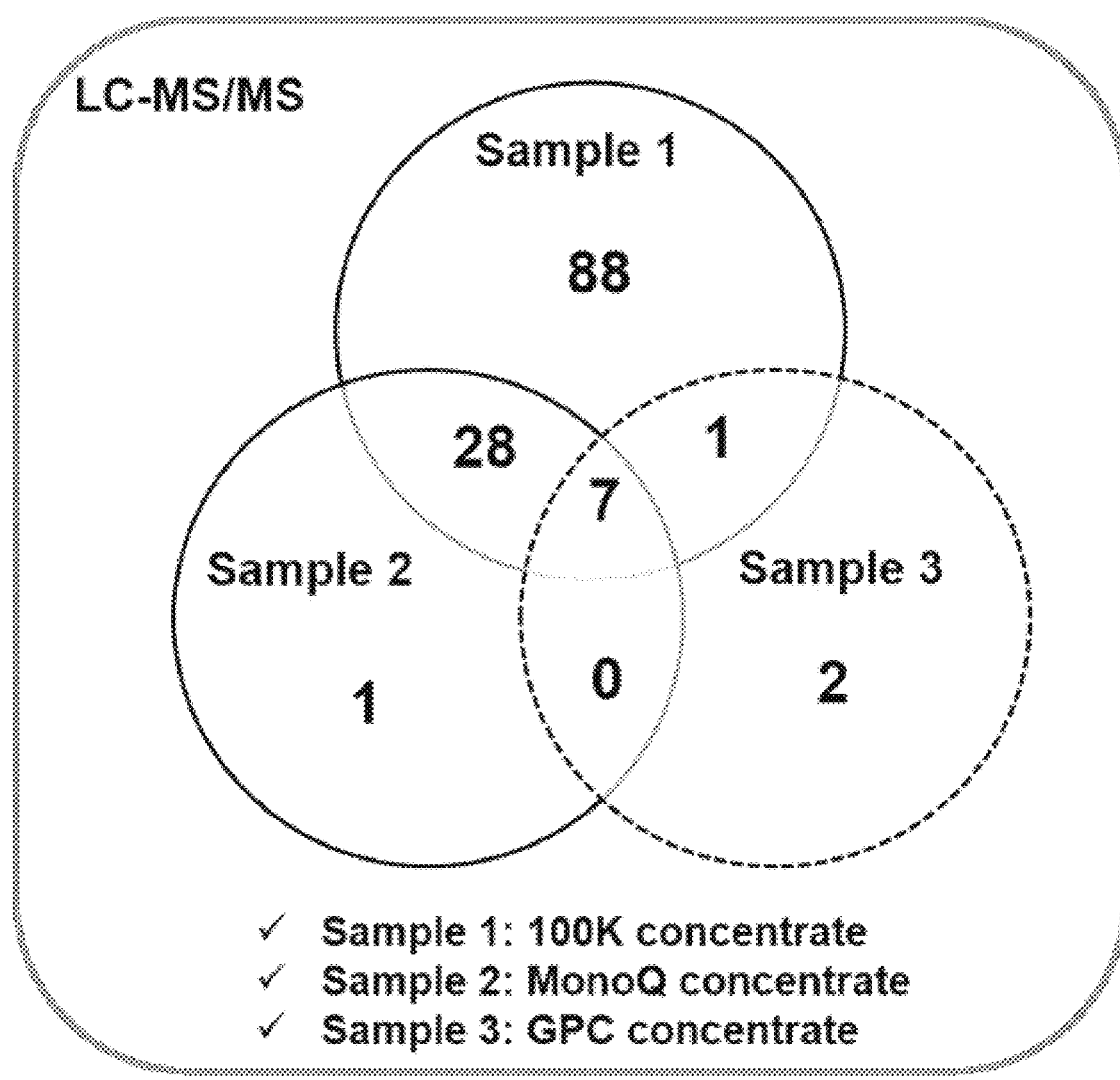
FIG. 9 shows a result of qualitative protein analysis of GLP-1 inducible fractions (100K, m2-m4, G17-G20) of *Akkermansia muciniphila* using LC/MS-MS.
Figure 9B:
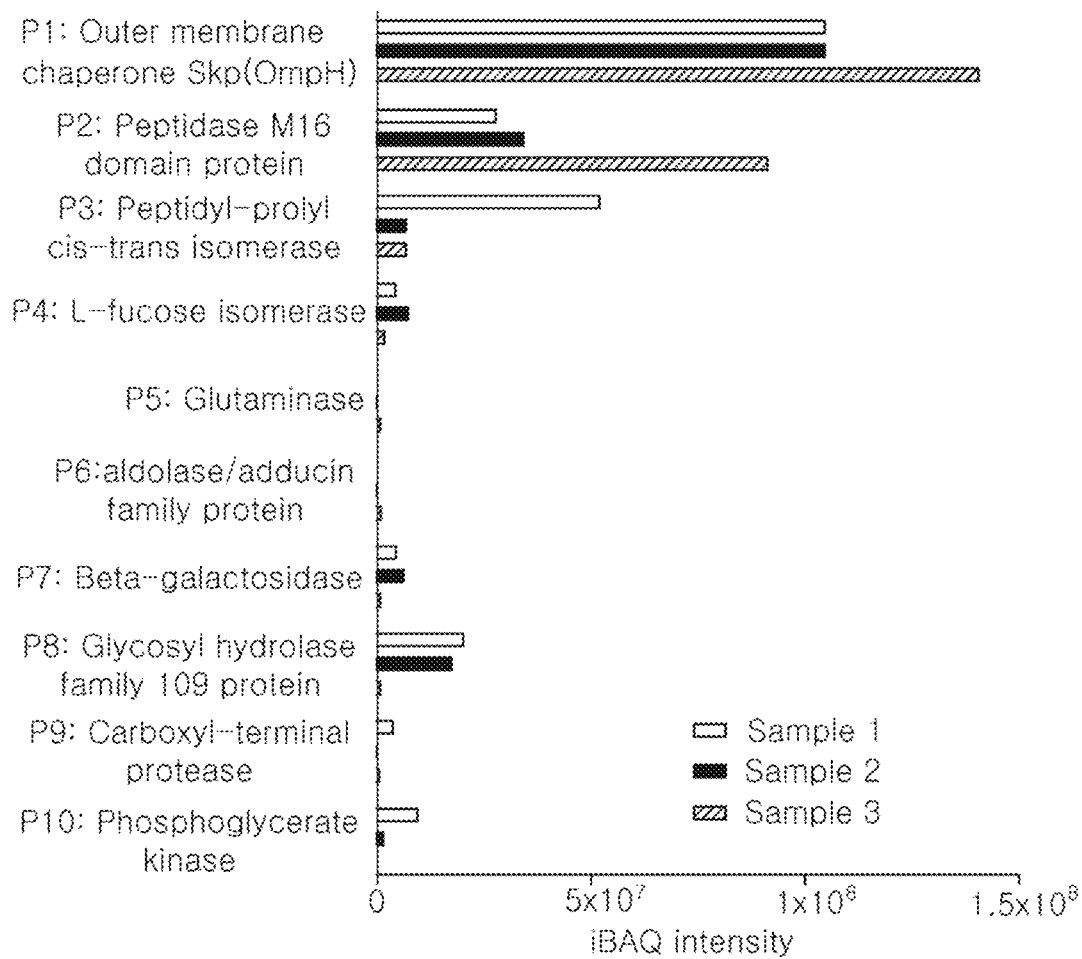

As a result of the experiment, 10 proteins were identified in Sample 3) G17-G20 fractions, where candidate protein was considered to be concentrated mostly (FIGS. 9A and B).

Example 9. Confirmation of GLP-1 Inducibility by Purely Purified Candidate Protein 10 proteins from the concentrated fraction of *Akkermansia muciniphila* were cloned and expressed in *E. coli* BL21 cells, then each protein was purified. One (beta-galactosidase) of the 10 proteins was excluded from the following steps because no effective expression vector could be cloned. Then, expression and purification of 9 proteins were verified by SDS-PAGE. Amuc1100, a protein derived from *Akkermansia muciniphila* which is known to have an anti-obesity function (Plovier H. et al., A purified membrane protein from *Akkermansia muciniphila* or the pasteurized bacterium improves metabolism in obese and diabetic mice. Nat Med. (2017) 23:107-113), was used as a positive control. Each of the isolated proteins was treated on L cells to confirm the secretion of GLP-1.

For this purpose, the synthesized genes for target proteins were inserted into a pET-21b plasmid (Novagen) with an IPTG inducible promoter, and proteins were purified employing his-tag. This was confirmed by SDS-PAGE gel. Large-scale production and purification of proteins were enabled by the transformation of BL21 *Escherichia coli* strain with synthesized plasmid and culturing, and proteins were treated on NCI-H716 cell line after quantification of the concentration.

Figure 10C:
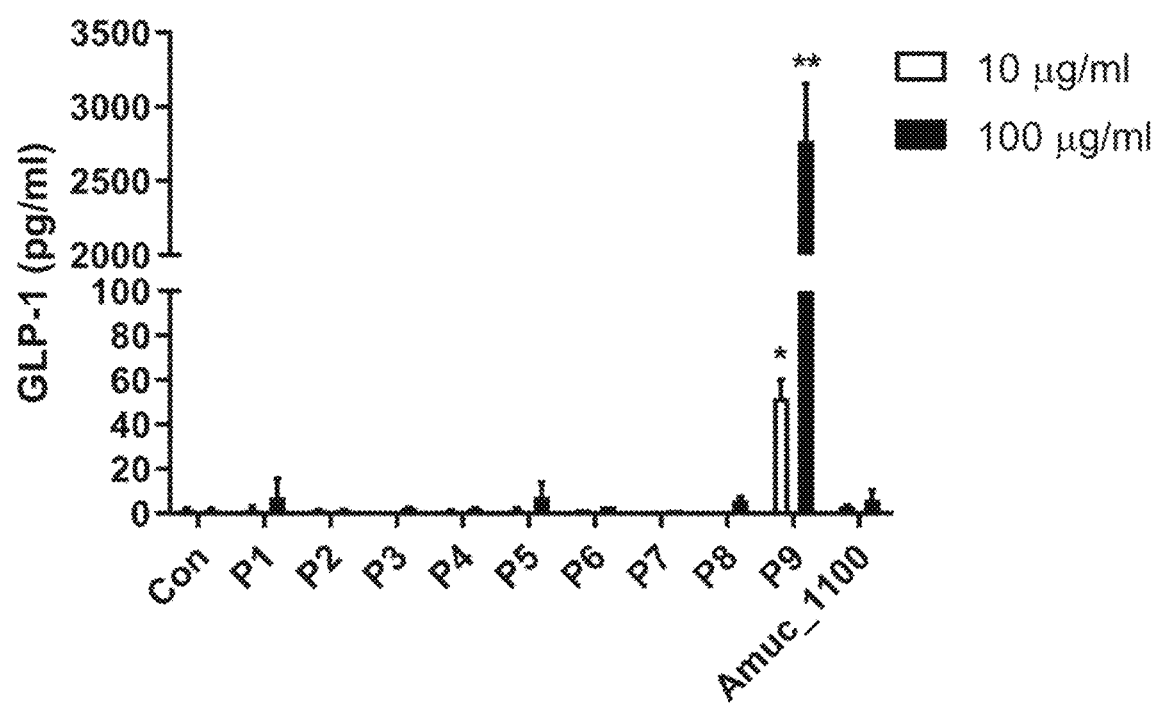
FIG. 10 shows experimental results monitoring the inducibility of GLP-1 by purified candidate proteins (SDS-PAGE gel).

As a result of the experiment, interestingly, it was confirmed that the secretion of GLP-1 was induced by the proteins B2UKW8 (P1), B2URM2 (P5), and B2UM07 (P9), and in particular, it was confirmed that the B2UM07 protein induced GLP-1 at a significantly higher level than the Amuc1100 protein at both 10 µg/ml and 100 µg/ml (FIG. 10C).

Example 10. Confirmation of Intra-Body Glucose Homeostasis Capacity of Target Protein (Normal Diet, Intraperitoneal Administration)

In order to confirm whether the glucose homeostasis capability in the body is improved by the identified target protein, P1 (B2UKW8), P5 (B2URM2), and P9 (B2UM07) proteins were administered intraperitoneally to normal diet mice for a week at a concentration of 100 µg/mouse, then glucose tolerance was tested.

Figure 11A:
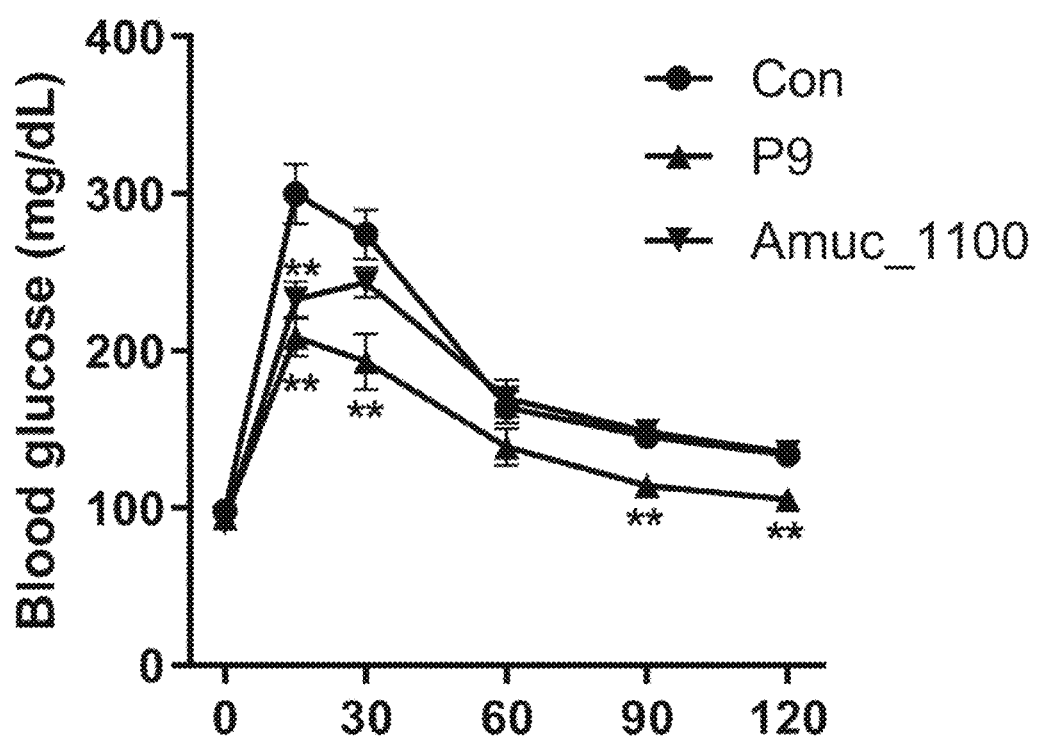
FIG. 11 shows result of an experiment confirming intrabody glucose homeostasis capacity of intraperitoneally administered target protein.
Figure 11B:
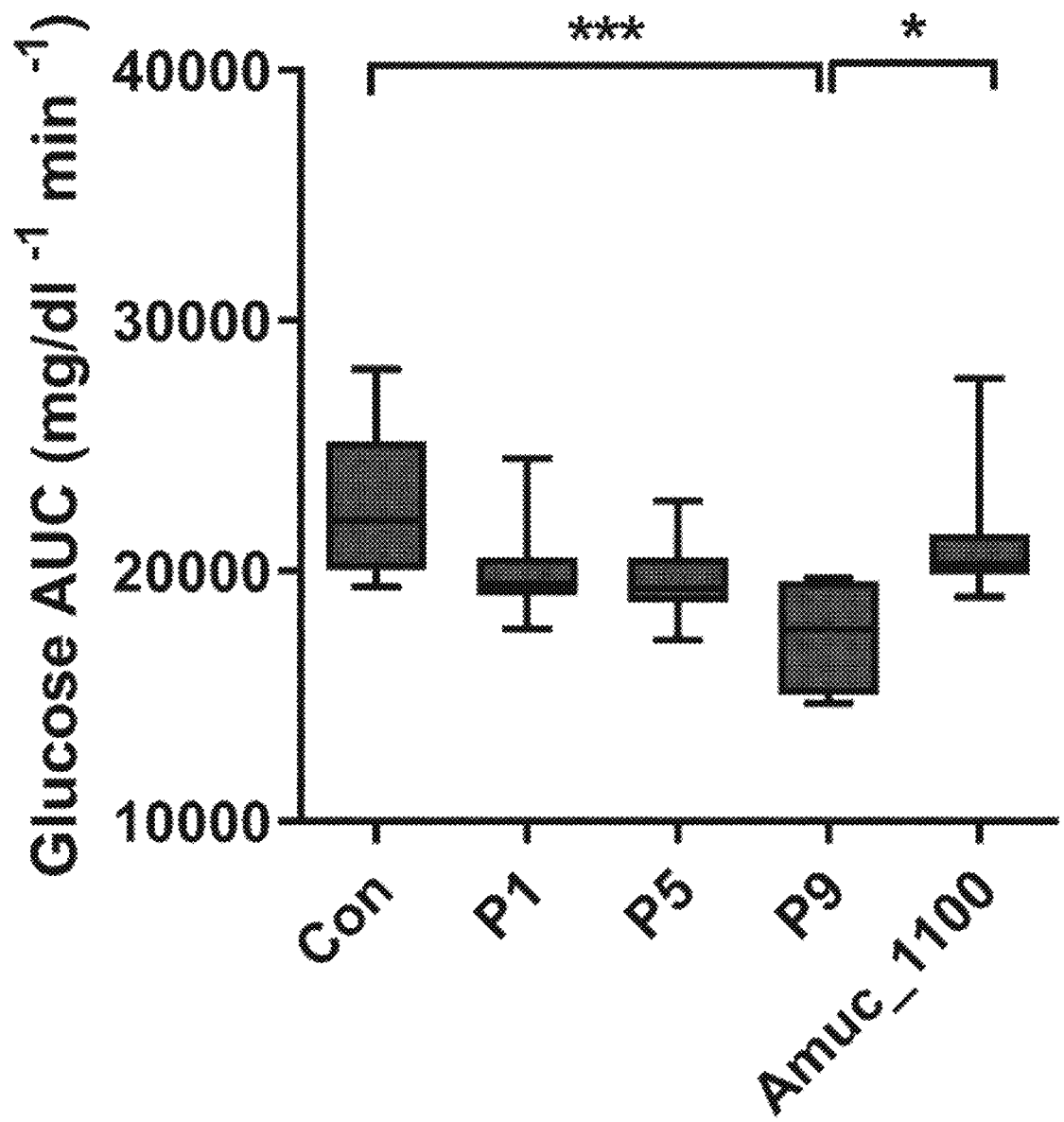

For this purpose, 3 effective proteins (P1, P5, P9) were intraperitoneally administered to normal diet mice at a concentration of 100 µg/200 µl daily, and at $7^{th}$ day the body weight was compared with the non-administered group (n=8/Group, FIG. 11C), then after 14 days of administration, glucose was administered orally at a concentration of 2 g/kg followed by measuring blood glucose from 15 to 120 minutes as timed glucose tolerance test (FIGS. 11A and 11B).

Figure 11C:
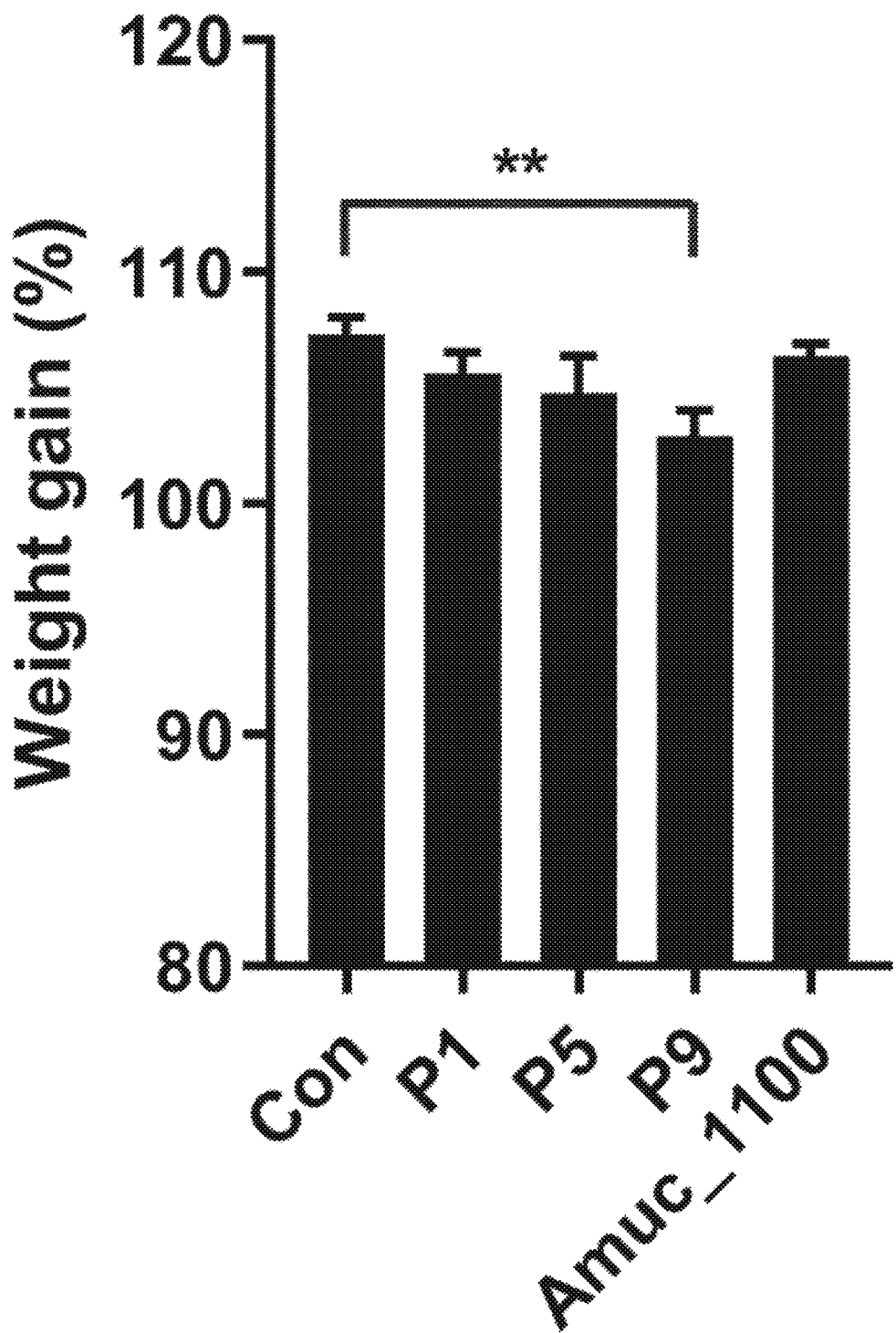

As a result of the experiment, it was confirmed that the P9 (B2UM07) administered group maintained significantly lower blood sugar than the other groups. This was shown to be more effective than Amuc1100 protein derived from *Akkermansia muciniphila*, which is known to confer glucose tolerance. P1 (B2UKW8) and P5 (B2URM2) showed only the glucose tolerance trend, however in the case of the P9 group, weight reduction was also confirmed to be significant (FIG. 11C).

Example 11. Confirmation of Intra-Body Glucose Homeostasis Capacity of Target Protein (High Fat Diet, Oral Administration)

In order to confirm whether the ability of glucose homeostasis in the body is improved by the identified target protein, P9 (B2UM07) protein was administered orally to high fat diet mice at a concentration of 100 µg/mouse for 8 weeks, and a glucose tolerance test was performed. Blood glucose was measured for 15 to 120 minutes after oral administration of glucose (2 g/kg).

Figure 12A:
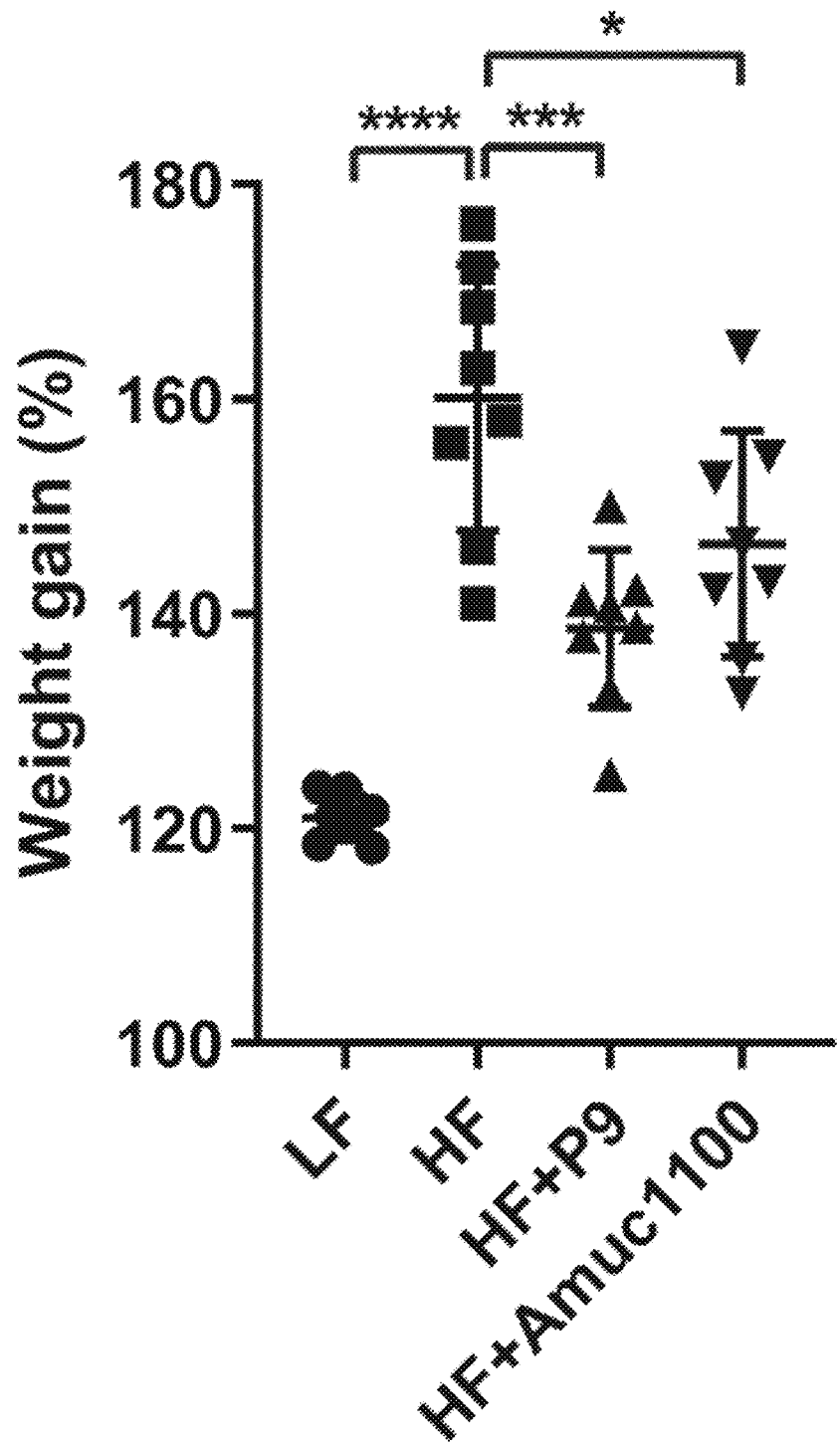
FIG. 12 shows result of an experiment confirming intrabody glucose homeostasis capacity of orally administered target protein.
Figure 12B:
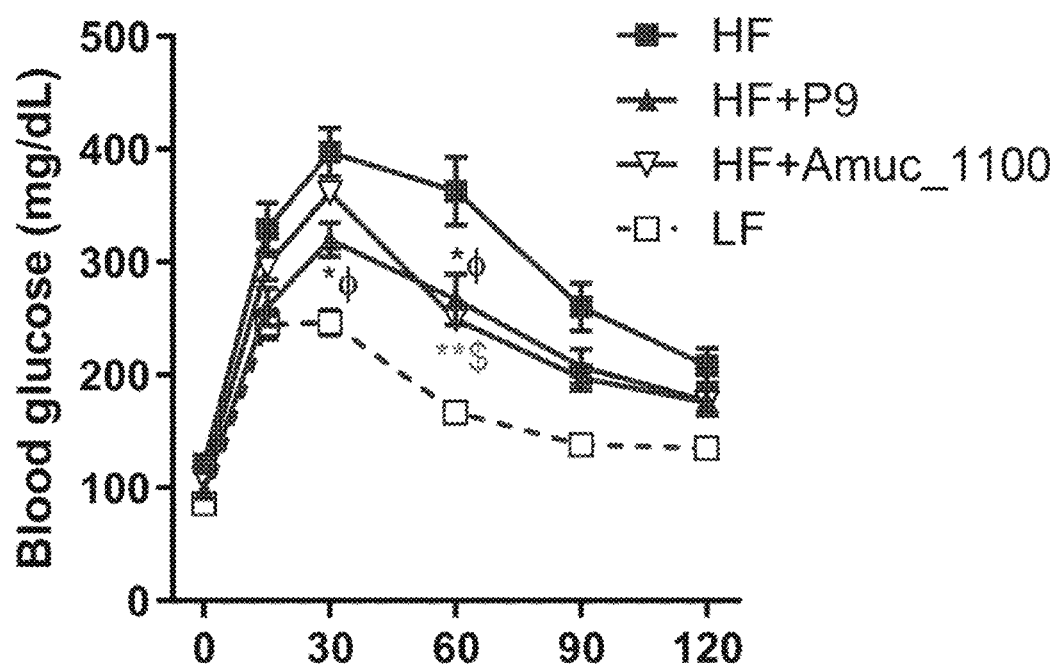
Figure 12C:
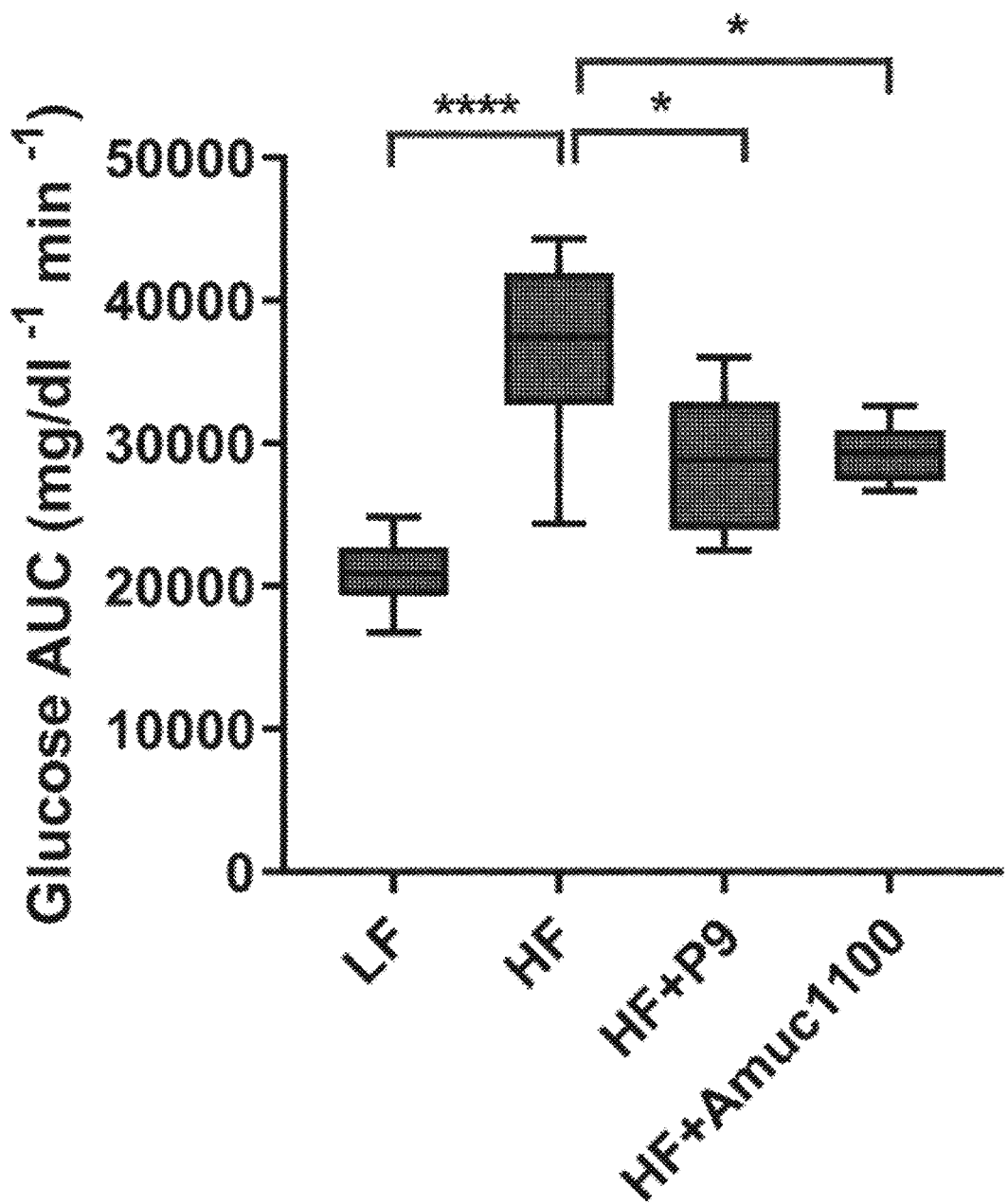

As a result of the experiment, the P9 (B2UM07) administered group showed a significant inhibitory effect against the weight gain compared to the high fat diet mouse group, and the effect was greater than that of the Amuc1100 administered group (FIG. 12A). In addition, 30 minutes after glucose administration, it was confirmed that the glucose homeostasis capability was significantly regulated compared to the high fat diet mouse group (FIGS. 12B and 12C).

The invention claimed is:

1. A method of suppressing appetite or treating metabolic diseases associated with glucagon-like peptide-1 (GLP-1), comprising administering a composition comprising *Akkermansia muciniphila* SNUG-61027 strain with accession number KCTC 13530BP to a subject in need thereof.

2. The method according to claim 1, wherein the *Akkermansia muciniphila* SNUG-61027 strain with accession number KCTC 13530BP comprises 16S rDNA consisting of a nucleotide sequence of SEQ ID NO: 1.

3. The method according to claim 1, wherein the metabolic disease associated with glucagon-like peptide-1(GLP-1) is impaired glucose tolerance, diabetes, arteriosclerosis, hyperlipidemia, hypercholesterolemia, fatty liver, cardiovascular disease, or obesity.

\* \* \* \* \*